(12) United States Patent
Bhagavatula et al.

(10) Patent No.: US 7,400,797 B2
(45) Date of Patent: Jul. 15, 2008

(54) TRANSVERSE CLOSED-LOOP RESONATOR

(75) Inventors: Venkata A Bhagavatula, Big Flats, NY (US); Sean M Garner, Elmira, NY (US); James S Sutherland, Corning, NY (US)

(73) Assignee: Corning Incorporated, Corning, NY (US)

( * ) Notice: Subject to any disclaimer, the term of this patent is extended or adjusted under 35 U.S.C. 154(b) by 118 days.

(21) Appl. No.: 10/960,831

(22) Filed: Oct. 6, 2004

(65) Prior Publication Data

US 2006/0072875 A1 Apr. 6, 2006

(51) Int. Cl.
*G02B 6/30* (2006.01)
*H01S 3/083* (2006.01)

(52) U.S. Cl. .............. 385/32; 385/28; 385/50; 372/94

(58) Field of Classification Search ............ 385/28, 385/32, 50; 372/94
See application file for complete search history.

(56) References Cited

U.S. PATENT DOCUMENTS

| | | | |
|---|---|---|---|
| 4,695,121 A | 9/1987 | Mahapatra et al. | 350/96.12 |
| 4,743,083 A | 5/1988 | Schimpe | 350/96.19 |
| 5,343,490 A | 8/1994 | McCall | 372/94 |
| 5,878,070 A | 3/1999 | Ho et al. | 372/92 |
| 6,009,115 A | 12/1999 | Ho | 372/92 |
| 6,052,495 A | 4/2000 | Little et al. | 385/2 |
| 6,490,039 B2 * | 12/2002 | Maleki et al. | 356/436 |
| 6,567,436 B1 | 5/2003 | Yao | 372/32 |
| 6,573,813 B1 | 6/2003 | Joannopoulos et al. | 333/342 |
| 6,580,851 B1 | 6/2003 | Vahala et al. | 385/30 |
| 6,583,399 B1 | 6/2003 | Hunziker et al. | 250/214 |
| 6,594,061 B2 | 7/2003 | Huang et al. | 359/239 |

(Continued)

FOREIGN PATENT DOCUMENTS

WO    WO00/35057    6/2000

(Continued)

OTHER PUBLICATIONS

"Temperature-Intensive Interferometer Using A Highly Birefreingent Photonic Crystal Fiber Loop Mirror" Zhao, et al IEEE Photonics Technology Letters, vol. 16, No. 11, Nov. 2004, pp. 2535-2537.

(Continued)

*Primary Examiner*—Michelle R. Connelly-Cushwa
*Assistant Examiner*—Jerry T. Rahll
(74) *Attorney, Agent, or Firm*—Gregory V. Bean; Juliana Agon

(57) ABSTRACT

A transverse closed-loop fiber resonator (10) includes an inner cladding (102) having a surface (300) peripherally forming a closed-loop shape for confining light to the surface (300). The inner cladding has a first diameter thickness (104) and a first index of refraction profile in a cross-sectional portion of the transverse closed-loop fiber resonator (10). A ringed-core (120) corresponding to the closed-loop shape is disposed on the corresponding surface of the inner cladding (102). The ringed-core (120) has a second thickness (124) of material thinner than the first diameter thickness (104), and a second index of refraction profile greater than the first index of the inner cladding by an index delta in the cross-sectional portion of the transverse closed-loop fiber resonator such that the ringed-core can guide light within the ringed-core traversely around the closed-loop shape.

28 Claims, 14 Drawing Sheets

U.S. PATENT DOCUMENTS

| | | |
|---|---|---|
| 6,625,349 B2 | 9/2003 | Zhao et al. .................... 385/30 |
| 6,633,696 B1 | 10/2003 | Vahala et al. ................. 385/27 |
| 6,657,731 B2 | 12/2003 | Tapalian et al. ............. 356/480 |
| 6,765,211 B2 | 7/2004 | Tapalian et al. ........ 250/339.07 |
| 6,891,997 B2 * | 5/2005 | Sercel et al. .................. 385/30 |
| 2001/0004411 A1 | 6/2001 | Yariv .......................... 385/28 |
| 2002/0018611 A1 | 2/2002 | Maleki et al. ................. 385/15 |
| 2002/0041730 A1 | 4/2002 | Sercel et al. ................. 385/30 |
| 2002/0044739 A1 | 4/2002 | Vahala et al. ................ 385/30 |
| 2002/0068018 A1 | 6/2002 | Pepper et al. ............ 422/82.05 |
| 2002/0081055 A1 | 6/2002 | Painter et al. .................. 385/2 |
| 2004/0008942 A1 | 1/2004 | Scheuer et al. ............... 385/39 |
| 2004/0008948 A1 | 1/2004 | Chin et al. .................... 385/50 |
| 2004/0023396 A1 | 2/2004 | Boyd et al. ................. 435/872 |
| 2004/0100675 A1 | 5/2004 | Matsko et al. ............... 359/245 |
| 2004/0146431 A1 | 7/2004 | Scherer et al. ........... 422/82.05 |

FOREIGN PATENT DOCUMENTS

| | | |
|---|---|---|
| WO | WO00/43816 | 7/2000 |
| WO | WO02/16986 | 2/2002 |
| WO | WO2004/072686 | 8/2004 |

OTHER PUBLICATIONS

T.A. Birks et al.; "High-Resolution Measurement of the Fiber Diameter Variations Using Whispering Gallery Modes and No Optical Alignment"; IEEE Photonics Technology Letters, vol. 12, No. 2, Feb. 2000; pp. 182-183.

G. Bourdon et al.; "Ultralow Loss Ring Resonators Using 3.5% Index-Contrast Ge-Doped Silica Waveguides"; IEEE Photonics Technology Letters, vol. 15, No. 5, May 2003; pp. 709-711.

* cited by examiner

TRANSVERSE CLOSED-LOOP RESONATOR

BACKGROUND OF THE INVENTION

1. Field of the Invention

The present invention relates generally to optical fiber couplers, and particularly to lossless coupling in a closed-loop to form a high-Q optical resonator.

2. Technical Background

In general, index-guiding waveguiding structures are known, such as standard optical fibers and planar waveguides operating by themselves as couplers or other light-guiding structures for confining and directing electromagnetic waves in a direction determined by its physical boundaries. Total Internal Reflection (TIR) is the known index-guiding mechanism for propagating the optical mode along the standard fiber axis. Low-loss waveguides result from confinement of the optical energy to the center of the waveguide using such index guiding. With TIR, the optical mode of the standard fiber, will not exist substantially circumferentially outside of the required outer cladding layer that has a lower index of refraction than the higher-index waveguiding core as an evanescent wave.

Evanescent fiber sensors and couplers based on standard fibers are known in the form of "D" shaped fibers. The preform from which a "D" fiber is drawn is polished away on one side until the core is close to the surface of the fiber. The fiber is then drawn and the thin layer of cladding glass remaining adjacent to the core in the previously polished region is etched away over a short length of fiber. The evanescent field of light propagating in the fiber is thus readily accessible only over that short length on a side of the fiber, not substantially circumferentially outside the entire tangential surface of the fiber. Evanescent fiber sensors and couplers can also be fabricated by redrawing an optical fiber so that the optical mode exists partially outside of the cladding layer. Similar to the "D" fiber geometry, the optical mode still propagates down the fiber axis.

The fiber itself can be used as an energy storage element as one type of a closed-loop or ring resonator. Two fiber directional couplers can be coupled to a long length of fiber laterally configured into a circular ring to form an optical all-fiber ring resonator or oscillator that has a high optical path length and a high free spectral range (FSR). Oscillating or resonating signals may then be generated around the ring being the energy storage element. The quality factor Q, or the energy storage time, of the energy storage element determines the spectral linewidth of the respective oscillating signal which can be used for a lot of different applications.

For much smaller devices, with high Q's, whispering-gallery mode resonators are used as another type of closed-loop resonators. Whispering-gallery mode or optical micro-cavity resonators or oscillators have been implemented by planar waveguides or microspheres coupled to etched, processed, or other non-uniformly smooth fibers or various combination of these components.

The high resonances encountered in these microcavities are due to whispering-gallery-modes (WGM) that are supported within the microcavities. As a result of their small size and high cavity Q, interest has recently grown in potential applications of microcavities to fields such as electro-optics, microlaser development, measurement science, high-precision spectroscopy, signal processing, sensing, modulating, switching, multiplexing, and filtering. By making use of these high Q values, microspheric cavities have the potential to provide unprecedented performance in numerous applications. For example, these microspheric cavities may be useful in applications that call for ultra-narrow linewidths, long energy decay times, large energy densities, and fine sensing of environmental changes, to cite just a few examples. In particular, a significant potential application for microcavity resonator devices is adaptation into known chemical/biological agent sensing devices. Chemical sensors known in the art include MEMS (microelectromechanical systems) chemical sensors, optical waveguide-based sensors, surface plasmon resonance (SPR) chemical sensors, surface acoustic wave (SAW) chemical sensors, mass spectrometers, and IR (infrared) absorption spectrometers. Miniaturized sensors, such as prior art MEMS sensors, provide significant advantages. For example, they would be well adapted for in situ functioning. Also, they would be small enough to be deployed in large numbers and implemented for remote probing.

High-Q resonators require that the optical path around the resonator loop be low loss. Therefore it is important that these resonators provide optical guiding in both lateral and transverse directions in order to minimize optical loss (lateral direction is perpendicular to the propagation direction while transverse direction is perpendicular to the direction of propagation and also perpendicular to the plane of the waveguide). Most conventional ring resonator configurations, such as planar ring resonators, spherical resonators, and spliced fiber ring resonators, use some guiding mechanism to make sure that the guided mode does not spread laterally (in a direction perpendicular to the plane of curvature of the resonator).

However, many difficulties present themselves when conventional planar or fiber processed technology, i.e. etching, is used in order to fabricate high quality optical resonators, because the planar or fiber surfaces must show deviations of less than about a few nanometers to minimize scattering optical loss due to the inhomogeneity or other irregularities on the surface. Optical microsphere resonators, on the other hand, can have Q's that are several orders of magnitude better than typical surface etched optical micro-resonators, because these microcavities can be shaped by natural surface tension forces during a liquid state fabrication, such as in the well-known fiber-drawing process. These microcavities are inexpensive, simple to fabricate, and are compatible with integrated optics.

Coupling efficiency is highly dependent on how the ring resonator is used. The efficiency is affected by factors such as: the planar waveguide geometry, the distance between the cylinder, ring, or sphere and planar waveguide, the interaction length, the coupling index. The efficiency is thus highly application specific and complicated to maximize.

Thus, even with microsphere resonators, in order for the potential of microcavity-based devices to be realized, it is necessary to couple light selectively and efficiently into the microspheres. Since the ultra-high Q values of microcavities are the result of energy that is tightly bound inside the cavity, optical energy must be coupled in and out of the high Q cavities, without negatively affecting the Q. Further, the stable integration of the microcavities with the input and output light coupling media should be achieved. Also, controlling the excitation of resonant modes within these microcavities is necessary for proper device performance, but presents a challenge for conventional waveguides.

Typically, good overall performance is gained by accessing the evanescent field in a waveguide. Also, only waveguide structures provide easy alignment and discrete, clearly defined ports. However, power extraction from the input optical radiation has proved to be inefficient for conventional planar waveguides due to cavity and waveguide mode leakage into the substrate and into the modes within the fiber cladding.

It is already known that passive alignment of a cylinder resonator to a planar waveguide is desirable when evanescent optical coupling occurs. However prior structures are not optimum for coupling or alignment with only the relative transverse positioning maintained. More important than the transverse position is the relative vertical position of the waveguide and resonator. These prior structures do not provide this alignment or are overly complex.

In known ring resonator approaches where a planar waveguide is combined with a circular structure for confining whispering-gallery modes, the resonator guiding structure is optimized for coupling to guided modes with relatively small lateral (parallel to the plane of a planar waveguide) and transverse (perpendicular to the plane of a planar waveguide) extents (e.g. 5-20 um in width) or guidance of the resonator. Extent is the mode field width in either the lateral (parallel to the substrate plane or fiber axis) or transverse (perpendicular to the substrate plane or fiber axis) direction. For optical wavelengths in the 0.5-2.0 um range, this mode field will diverge rapidly if no mode guiding mechanism is provided.

In the case of a spherical resonator coupled to a planar waveguide or a tapered fiber guided mode, such as in U.S. Pat. No. 6,583,399, radial mode confinement is provided by the high index difference between the surface of the sphere and the air cladding, combined with a natural outward shifting of the mode due to its constantly bending path in propagation of the light around the sphere. Azimuthal confinement (parallel to the plane of the planar waveguide) is naturally provided by the curved surface of the sphere, which produces the equivalent of a graded-index profile in the azimuthal direction.

In the case of a cylindrical resonator coupled to a planar waveguide or tapered fiber guided mode such as in U.S. patent application 2002/0081055 and U.S. patent application 2002/0044739, radial mode confinement is again provided by the high index difference between the surface of the sphere and the air cladding, combined with a natural outward shifting of the mode due to its constantly bending path in propagation around the sphere. Lateral confinement (parallel to the plane of a planar waveguide) is provided by local removal, deposition, or alteration of guiding material immediately adjacent to the resonator waveguide. However, such processing methods to make the cylindrical resonator are hard to control with the potential of varying scattering losses.

It is therefore desirable to overcome the current problems by providing small, high-Q optical resonators that are precision controllable for maximum mode guidance, manufacturable, and cost-effective, for various applications including biological or chemical sensors with improved resolution.

SUMMARY OF THE INVENTION

One aspect of the invention is a transverse closed-loop fiber resonator including an inner cladding having a surface peripherally forming a closed-loop shape for confining light to the surface. The inner cladding has a first diameter thickness and a first index of refraction profile in a cross-sectional portion of the transverse closed-loop fiber resonator. A ringed-core corresponding to the closed-loop shape is disposed on the corresponding surface of the inner cladding. The ringed-core has a second thickness of material thinner than the first diameter thickness, and a second index of refraction profile greater than the first index of the inner cladding by an index delta in the cross-sectional portion of the transverse closed-loop fiber resonator such that the ringed-core can guide light within the ringed-core traversely around the closed-loop shape.

In another aspect, the present invention includes a transmission waveguide for evanescently coupling with the index-guided resonant optical mode of the ringed-core.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

DETAILED DESCRIPTION OF THE PREFERRED EMBODIMENTS

Figure 1:
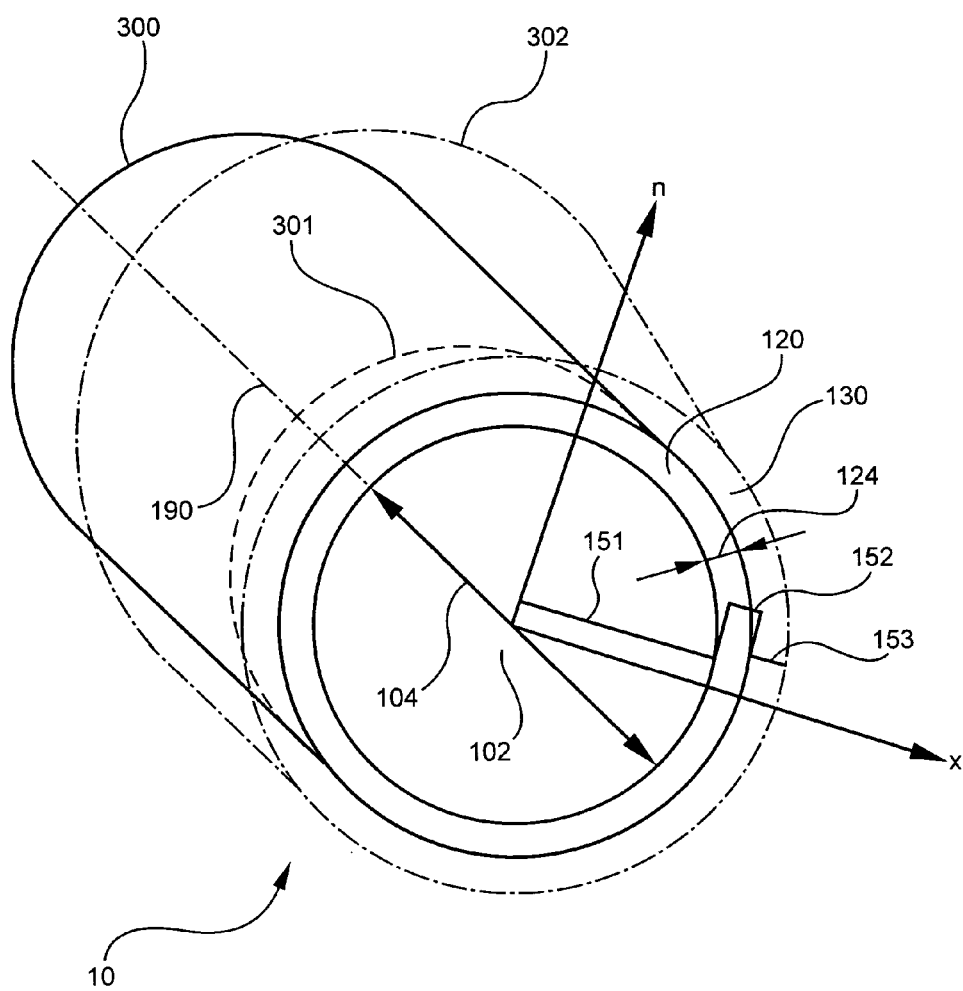
FIG. 1 is a perspective view of the transverse closed-loop fiber resonator 10 of the present invention.

Reference will now be made in detail to the present preferred embodiments of the invention, examples of which are illustrated in the accompanying drawings. Whenever possible, the same reference numerals will be used throughout the drawings to refer to the same or like parts. One embodiment of the transverse closed-loop fiber resonator of the present invention is shown in FIG. 1, and is designated generally throughout by the reference numeral 10.

A transverse closed-loop fiber resonator 10 includes an inner cladding 102 having a surface 300 peripherally forming a closed-loop shape for confining light to the surface 300. The inner cladding has a first diameter thickness 104 and a first index of refraction profile in a cross-sectional portion of the transverse closed-loop fiber resonator 10. A ringed-core 120 corresponding to the closed-loop shape is disposed on the corresponding surface of the inner cladding 102. The ringed-core 120 has a second thickness 124 of material thinner than the first diameter thickness 104, and a second index of refraction profile greater than the first index of the inner cladding by an index delta in the cross-sectional portion of the transverse closed-loop fiber resonator such that the ringed-core can guide light within the ringed-core traversely around the closed-loop shape.

The inventive resonating fiber 10 has a propagation direction around its surface 300, preferably a circumference (but other closed-loop shapes are possible, such as spheres 301, or octagonal, elliptical, or conical 302 members), if the closed-loop shape is a cylinder such as in a fused silica fiber having the first diameter thickness 104 of about 125 µm. Moreover, the optical mode of the closed-loop resonating fiber 10 has an external evanescent field whose external tail 328 can be seen in FIGS. 3 and 4. Index-profiling is used to force light propagation around the cylinder circumference (not the longitudinal fiber axis 190) and to provide for an evanescent field outside of the cylinder shape of the fiber. A low-loss total internal reflection (TIR) waveguide results by confining the optical energy to the center of the waveguide using index guiding while forcing the light to be propagated around the substantially cylinder circumference or any other shape's surface 300 with the optical mode 320 extending just slightly outside (greater than or equal to about 0.1% of optical power as seen by the tail 328) of the cylinder surface 300. A structure with suitable thickness and index combinations can be modeled using guided modes by requiring the structure to have such a usable at least 0.1% or similar evanescent field. The optical power existing outside of the cylinder is a function of the geometry of the inner cladding, whether it is a cylinder, a sphere, or other arcute member (thickness, index of refractions, the index of the surrounding materials, and the diameter of the cylinder) and the resonating wavelength of operation. Therefore exactly how much bigger the ringed-core's index must be than the inner cladding's index is dependent on the particular application. To allow for index variations within each dielectric region, serving as the inner cladding 102, the ringed-core 120, and the outer cladding 130, the average index of the ringed-core material 152 is definitely greater than the average index of the inner cladding material 151. The ringed-core's average index 152 is large enough to actually guide the light and is very similar to the way a single-mode fiber core index is slightly raised to guide the light within the longitudinal optical axis. If the index delta is too small, the light will not be confined to the ringed-core 120 and the light may diffract into the inner cladding 102 in an unguided way. The desired index profile is predetermined by modeling or other evaluations such that the index difference [difference in average refractive index (e.g., $N_{ringed-core} - N_{inner\ cladding}$) where $N_{ringed-core}$ is $>N_{inner\ cladding}$] and layer thickness is such that at least one guided mode has an effective index greater than both the average index of the inner cladding layer 151 and the index of the outer cladding layer 130 (and less than the average index of the ringed-core layer 152).

With an appropriate index of refraction profile for TIR, light is traversing the same path multiple times and interferes with itself along the fiber circumference or shapes of other surfaces 300. For use as a resonator, it is important to have a recursive optical path (to provide feedback such as in a laser resonator) and also an external evanescent field.

Referring back to FIG. 1, an outer cladding 130 corresponding to the closed-loop shape of the inner cladding 102 surrounds the corresponding surface of the ringed-core 120. Preferably, the outer cladding has a third index of refraction profile (or an average 153 to allow the profile to be index-stepped, graded, or other index variations) less than the second index of refraction profile (or an average 152 to allow the profile to be index-stepped, graded, or other index variations) of the ringed-core. Multi-layers with different indices could be used for one or all three dielectric regions, inner cladding 102, ringed-core 120, and outer cladding 130, as long as the average index of the ringed-core 120 is greater than the average index of the inner cladding 102, and greater than the average index of the outer cladding 130.

The high index guiding layer provided by the ringed-core 120 and any other optional layers on its surface are designed and selected (thickness and index) based on total internal reflection waveguiding. This requires at least one high index layer with at least one low index layer on each side of the at least one high index layer. In the simplest case air is considered a low index layer and can serve as the outer cladding 130. Hence, an actual outside fabricated cladding layer is optional and represented by the dashed lines 130. If the outside fabricated cladding is present, the fabricated outer cladding 130 must be thin enough ("thin" depends on its refractive index) to allow part of the optical mode to exist beyond its outer surface. The waveguiding layer of the ringed-core 120 is preferably only microns thick, approximately 1-3 um. An outer cladding 130 with this thickness (preferably 1-3 um out of a possible range of 1-5 um) on the outside of the ringed-core should be suitable for the optical mode traveling circumferentially around the fiber's ringed-core 120. For various different applications, the outer cladding 130 could have an index of refraction less than the first index of refraction profile of the inner cladding 102 and still provide guiding. Certainly this is the case for air as the outer cladding. However, an outer cladding index of refraction greater than air but less than the inner cladding is also possible. For example, if the outer cladding 130 was water or matched to water, it would have an index of refraction of around 1.33.

A single surface dielectric layer with slightly higher index of refraction than the rest of the cylinder, a sphere, or any other closed-loop shape could suffice as the ringed-core 120. More complex multi-layer structures could also be used, but optical modeling would be needed to show how different index layer profiles could result in a different mode field diameter (like LEAF® fiber available from Corning compared to SMF-28® fiber also available from Corning. In general, thickness and indices of refraction would be selected via modeling of guided modes in cylinders.

The inventive waveguide structure based on total internal reflection (with optional step index or graded index changes as some of the index variations within a single dielectric region) is distinguished from those based on whispering gallery modes. The inventive design thus has at least three regions of dielectric material. These three regions cause index guiding of the mode on two sides while traveling around the cylinder circumference. Whispering gallery modes on the other hand rely on only one index change plus a required cylinder curvature to govern the guiding. More specifically, whispering gallery modes do not rely on a second index change on the inside of the cylinder.

The resonating cylinder or fiber can be used alone without an optional transmission waveguide, but the resonating cylinder or fiber 10 would then require coupling to a source of free space beam. Another use for the fiber resonator is for coupling light into and out of the resonator.

Figure 4:
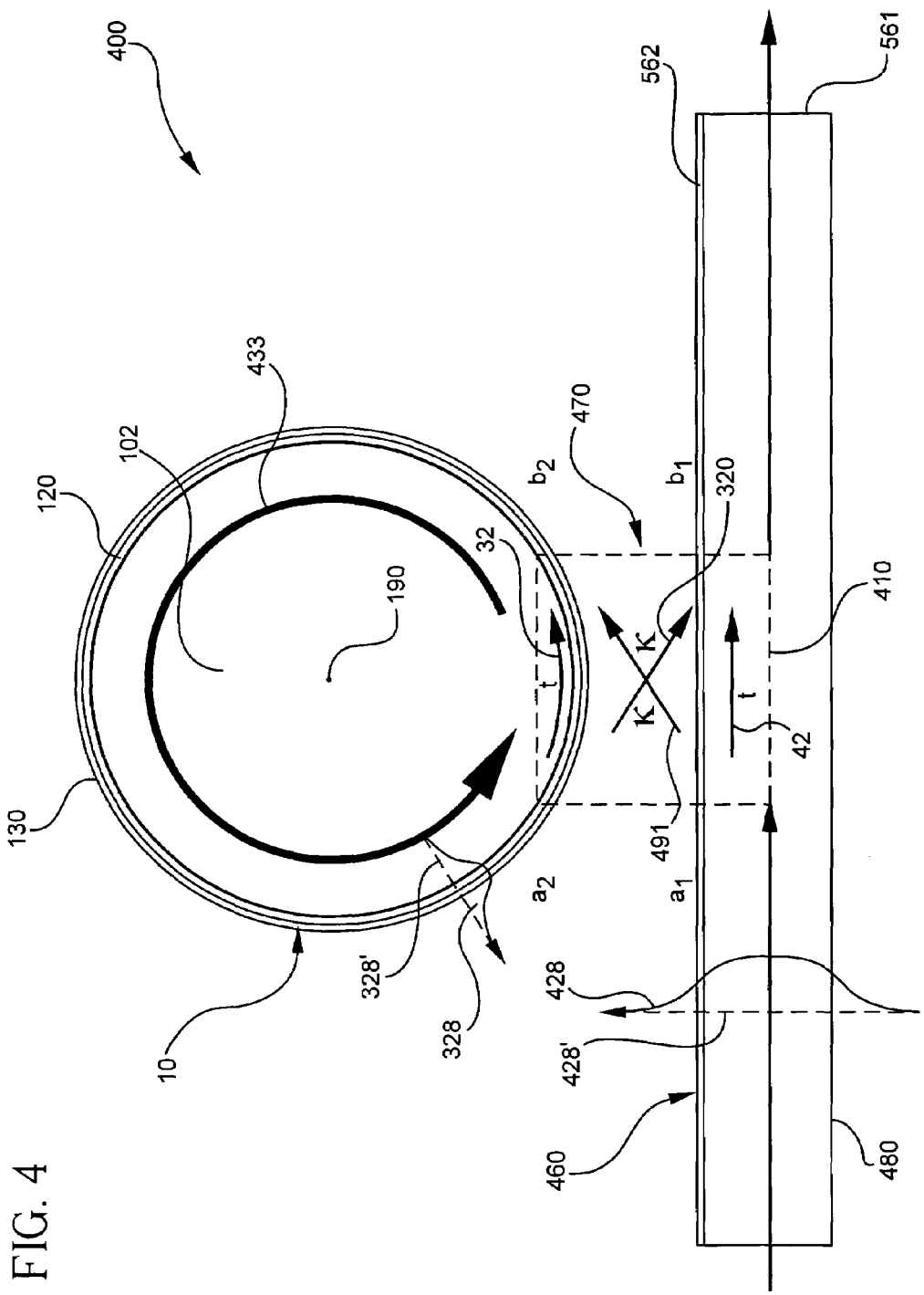
FIG. 4 is a 2-port configuration of the resonator 10 of FIG. 1 evanescently coupled with a transmission waveguide 460, in accordance with the present invention.

Referring to FIG. 4, an orthogonal resonating coupler 400 results from adding a transmission waveguide 460 having a propagation direction 480 parallel to an optical axis 490 and having a guided longitudinal mode with a first external evanescent field 491 to the resonating fiber or waveguide 10 of FIG. 1. As in FIG. 1, the same numbers have the same functions. However, in FIG. 4, the generic representation of the waveguides 10 or 460 are shown instead of their possible implementations, such as planar shapes, spheres, fibers, or other types of waveguides. As in FIG. 1, the resonating waveguide 10 has a propagation direction 433 circumferential, spherical, or otherwise circular or ring-like tangential to the longitudinal axis 190 and having a guided circumferential mode with a second external evanescent field 320. Arrows 32 and 42 represent the direction of propagation. As can be seen, the axis of the cylindrical resonator 190 is parallel to the optical resonator waveguide core layer which also is parallel to the lateral direction 190 that is perpendicular to the propagation direction 32. The radial direction 328' which is also the transverse direction is the direction perpendicular to the resonator waveguide core layer. Hence, reference arrow line 433 is the propagation direction of the optical resonator mode.

Correspondingly, the optical transmission waveguide core layer has a lateral direction that is perpendicular to both the propagation direction 42 and of the transverse direction 428'.

An interaction region 470 is provided in a tightly-close space between the transmission waveguide 460 and the resonating waveguide 10 for orthogonally coupling the first and second evanescent fields with their evanescent tails of the optical modes 428 and 328, respectively. Arrows 491 and 320 are pointing to the arrows showing the concept of power transfer between the waveguides 10 and 460 in the interaction region 470 where the evanescent fields will be interacting.

An important aspect of the resonating waveguide 10, in a cylindrical resonator or other circular form, is that an evanescent field extends beyond the surface of the resonator 10. As one possible application out of many, the evanescent field is important both for interrogating an optional binding layer on the surface of the resonator for biological or chemical sensing using index sensing, and for coupling light into and out of the resonator. The index of refraction profiles for the fiber resonator are therefore selected for optimizing the index-guiding design for optical propagation along the cylinder circumference or other circular surface 300 with part of the optical mode 320 existing outside the top optical or dielectric ringed-core layer 120.

Functionally, in the generic schematic for a two-port resonator device of FIG. 4, an input wave is guided by the transmission waveguide 460 from input to output past a circular resonator 10. The proximity of the transmission waveguide 460 to the resonator 10 results in a relatively small amount of power coupling between the two elements 460 and 10. The coupled wave propagates around the resonator 10 so that most of its power (assuming low resonator radiation losses) arrives back at the waveguide-resonator coupling region 470. A small fraction of the resonator wave power couples back into the transmission waveguide 460, while most of the power continues to propagate around the resonator 10.

The wave accumulates phase as it propagates around the resonator 10. For most input wavelengths, the phase accumulation around the resonator is not a multiple of $2\pi$. As a result, in general, some destructive interference occurs when the wave circulating in the resonator 10 meets the wave coupled from the transmission waveguide 460 in the coupling region 470. This combined wave continues to circulate around the resonator 10, with losses mounting on each pass due to phase mismatch conditions in the coupling region 470. The low power level in the resonator 10 leads to minimal power coupling across the coupling region 470 and into the transmission waveguide 460. Therefore, for most wavelengths, the power $b_2$ at the output of the resonator device 10 is approximately equal to the power at the input $a_2$ (depending on the degree of propagation loss in the resonator 10 and transmission waveguide 460).

For input wavelengths where phase accumulation around the round trip path length ring is at or nearly a multiple of $2\pi$, the power level in the resonator 10 builds up dramatically due to constructive interference in the coupling region 470. Large buildups of resonator power result in significant power coupling back into the transmission waveguide 460, even though only a small fraction of power is able to couple. A phase shift of approximately $-\pi/2$ is experienced by the wave each time it couples between the transmission waveguide 460 and the resonator 10 (in either direction). As a result, the phase of the wave coupled back into the transmission waveguide 460 is shifted from the original input wave by $-\pi$.

The power level of the wave coupled from the resonator 10 to the transmission waveguide 460 exactly matches the power level of the original input wave when the fraction of power lost on a single resonator round trip equals the fraction of power coupled from the transmission waveguide 460 to resonator 10 (or vise versa). In this case, the $-\pi$ phase shift of the resonator wave leads to an exact cancellation of the two waves, resulting in zero output power for the orthogonal resonating coupler 400 which is very similar to a directional coupler. Further, energy conservation rules dictate that propagation losses in the resonator 10 exactly match the input power for the orthogonal resonating coupler 400 such that the field amplitude at the cylindrical resonator port $a_1$ is unity (1).

Typical power outputs from a two-port resonator looks like a comb with resonances at periodic wavelengths. The actual form of the output power response depends on various physical and wave propagation parameters (resonator path length, coupling gap, waveguide width, wave propagation velocity and attenuation). The response is periodic because of the $2\pi n$ phase match conditions for resonance (n=1, 2 . . . ).

Modeling of the cylindrical fiber resonator of FIG. 1 as the resonator 10 mounted on a planar waveguide substrate 460 yields a practical two-port resonator device. The planar waveguide substrate 460 provides a high-index guiding layer for optical input and output signals, preferably coated with a thin overclad layer 562. A similar high-index waveguide structure is formed on the surface of the cylindrical resonator 10, with a high-index core waveguide 120 coated with a thin overclad layer 130. The guiding layers are represented here as slab waveguides 460, with no lateral mode confinement provided by the guiding structures. In general, a slab waveguide implies a continuous layer on the substrate with no vertical sides whereas planar waveguides incorporates slab and other substrate waveguides. (Depending on the diameter of the cylinder, the propagation wavelength, and cylinder round trip loss requirements, lateral mode confinement may or may not be required for the resonator 10.) The proximity of the planar waveguide 460 to the cylindrical waveguide 10 supports mode power coupling between the structures.

Modeling was done for cylinders 10 with diameters of 125 μm, 250 μm and 500 μm for the inner cladding 102. These diameters were selected for compatibility with existing drawn fiber and rod fabrication methods, where diameters can generally be controlled to <1 μm.

All of the modeling results assumed that the slab core 561 and cylinder waveguide core 120 thicknesses and indices are selected to support a single guided mode operation over the wavelength range of interest. This choice differentiates the cylindrical resonator structures from earlier air-cladding cylindrical resonator devices that only support many whispering gallery modes. Single-mode operation is expected to provide sharper filter responses than would be possible with multi-mode resonator devices.

Modeling is performed for wavelengths near 1550 nm and is based on slab 460 and cylinder 10 each with guiding layers with index delta ($\Delta n$) of 4.5% (where the formula for index delta (%) is [(ring core index value−inner cladding index value)/inner cladding index value]) between the core and clad. Planar waveguides with 4.5% index contrast have been demonstrated in the literature for planar ring resonator devices but were not used for the resonating fiber 10 in the past. The performance of the cylindrical resonator 10 in the orthogonal resonating coupler 400 is expected to be very similar to the prior-art planar ring resonator device when the same waveguide index contrast is used, and when the width of the planar ring resonator waveguides equals the slab 460 and cylindrical waveguide 10 thicknesses.

For a 4.5% step index contrast, the core layer thicknesses 124 of FIG. 1 are typically 1.5-2 μm for the core 120 of the resonating waveguide 10. Core 120, underclad 102 and overclad 130 layers can be formed via standard fiber techniques by controlling the radial distribution of Germanium or other common fiber dopants in a preform prior to fiber drawing. These layers could also be formed by dipping fibers in organic compounds with the desired optical indices. Precision control of the thin overclad layer 130 on the outer surface of the cylinder can also provide an accurate reference distance between cores 120 and 561 in the coupling region 470. The fiber draw process provides a precise and repeatable fabrication method for setting the core separation and gap index that offers processing advantages over ring resonators fabricated in planar devices, where directional coupler performance is directly tied to waveguide etch uniformity and overclad index uniformity which varies within wafers and wafer to wafer.

The field amplitude at cylindrical resonator port $a_1$ is assumed to be unity. Resulting powers at output port $b_1$ and within the cylinder at $a_2$ are expected to be proportional to $|b_1|^2$ and $|a_2|^2$, respectively. For the first modeling example, a coupler bar transmission ($|b_1|^2/|a_1|^2$) value of t=0.99 has been selected. In this case, coupling between the planar waveguide 460 and the cylinder waveguide 10 is weak, with only 1% of light coupled from the planar waveguide 460 into the cylindrical waveguide 10 guided mode. Weak coupling configurations are relatively easy to control via overclad thickness and index selection. For this example a cylindrical waveguide round trip transmission $\alpha$=0.99 has been selected, indicating that only 1% of the light in the cylindrical waveguide is lost due to scattering and waveguide bend loss effects. The large cylindrical waveguide core-cladding index delta of 4.5% helps provide strong guiding that makes this low loss possible.

An important point in the modeling of the planar waveguide-cylinder coupling is that the planar waveguide 460 and cylindrical waveguide 10 are sufficiently wide enough to reduce the 3D planar-cylinder coupling problem down to an equivalent 2D planar waveguide-ring waveguide coupler. This approximation is expected to be valid if the planar waveguide 460 is many times wider than it is thick. For modeling, it is assumed that lateral diffraction is minimized using either a very wide planar waveguide 460, or through implementation of some lateral guiding approach in the cylindrical waveguide (e.g., UV trimming) that limits the lateral losses in the cylindrical waveguides 10.

With these assumptions in place, the planar waveguide-cylinder resonator model provided results similar to earlier models of planar waveguide coupling into planar rings. For cylinders with different diameters as the diameter thickness of the inner cladding 102 of the resonating fiber 10, as expected, the free spectral range (FSR) of the filter decreases with increasing cylinder diameter.

From modeling results, the width of the $|b_1|^2$ transmission minimum was also reduced as the diameter of the cylinder is increased. This narrowing is an expected outcome of the FSR reduction as the diameter of the cylinder is increased. It also indicates that the width of the transmission minimum can be adjusted by controlling the diameter of the cylinder. Since typical fiber draw processes are able to control fiber diameters to <+/−0.5 um, these diameter variations should have minimal influence on the width of the transmission minimum.

Figure 5:
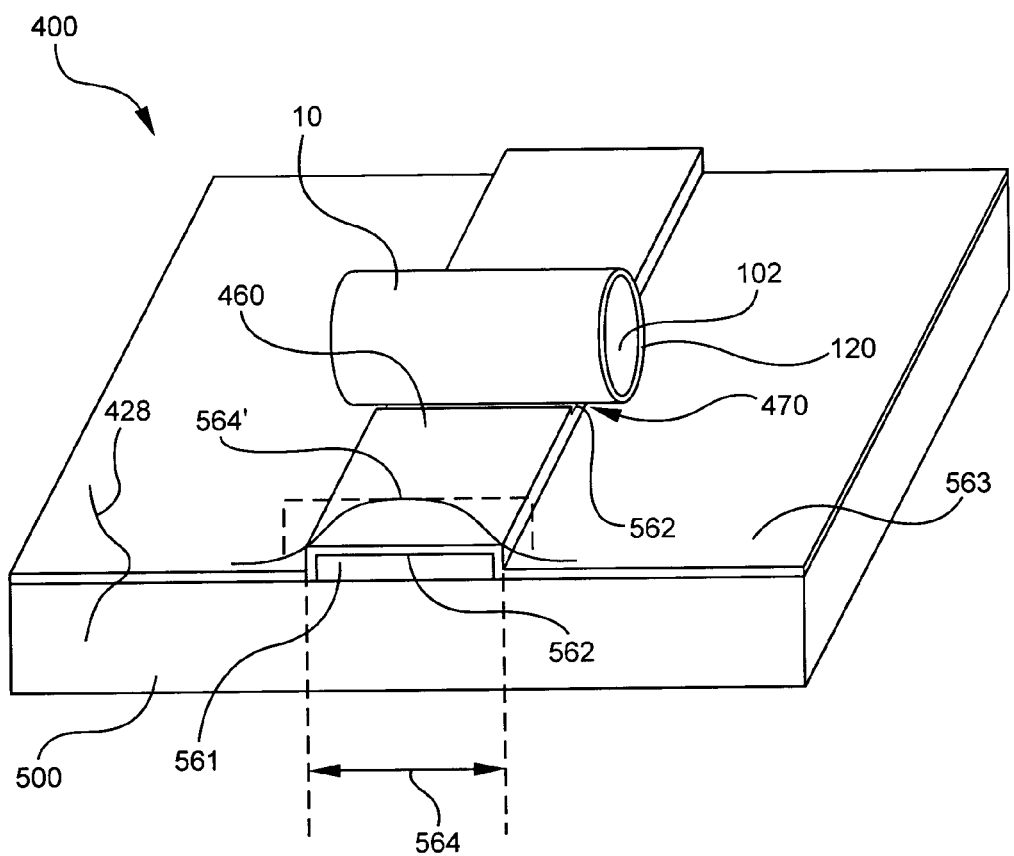
FIG. 5 is a perspective view of the resonator 10 of FIG. 1 evanescently coupled with a planar waveguide as the transmission waveguide 460, in accordance with the present invention.

Referring to FIG. 5, the transmission waveguide 460 of FIG. 4 takes on a planar physical shape while the resonating waveguide 10 of FIG. 4, takes on a physical cylindrical shape. As one possible embodiment, the orthogonal resonating coupler 400 includes an optical fiber with one or more precision dielectric ringed-core layers 120 as the confining or resonating structure 10 mounted on top of a planar waveguide, as the transmission waveguide 460 on a substrate 500. The fiber-planar resonator device 400 thus functions as a precision narrow-band optical filter. In many ways the orthogonal resonating coupler 400 behaves as a hybrid mix between a planar ring resonator structure and a collimator-based thin film filter device whose individual theories of operation and design are already known, but never combined. In the lateral direction, the orthogonal resonating coupler 400 is similar to a micro-optic component-based thin-film filter (TFF)—lateral confinement is provided within the resonator via the width of the external beam exciting the resonator, differing from most ring resonator configurations in terms of lateral guiding.

According to the teachings of the present invention, a cylindrical fiber resonator as the resonating waveguide 10 is mounted on a broad planar waveguide as a transmission waveguide 460, and preferably excited by the broad fundamental mode of the broad planar waveguide 460. A waveguide with a mode guided along a core parallel to a fiber's, planar waveguide's, or other such structure's optical axis 490 of FIG. 4 with an external evanescent tail is suitable for use as the transmission waveguide 460 provided some degree of mode matching exists. Optionally, the transmission fiber can be tapered down as seen in U.S. patent application 2002/0081055 and U.S. patent application 2002/0044739739 for use as the transmission waveguide 460.

Figure 14:
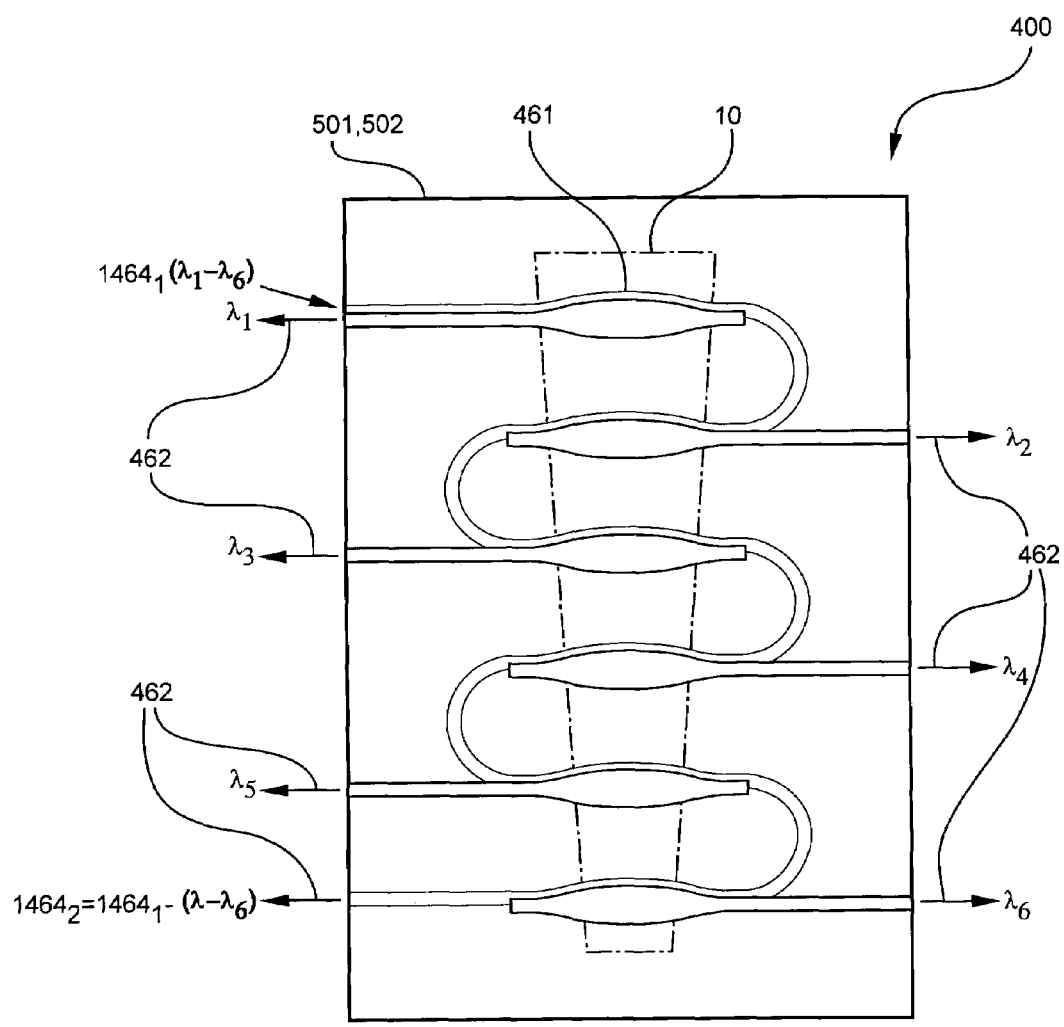
FIG. 14 is a top view of a 4-port configuration of the resonator 10 of FIG. 9 evanescently coupled with two transmission waveguides 461 and 462, in accordance with the present invention.

The broad planar waveguide 460 could be a channel or ridge waveguide. It could also be a slab waveguide if the slab is externally excited by a "broad" or effectively collimated beam of light such as from a micro-optic collimator. It would be appreciated that the slab waveguide or other planar waveguides could take on any meandering path, spiraling, zigzagging or other wise and its coupling regions could be tapered with its coupling regions 470 having the widest dimensions, depending on the application needed as seen in FIG. 14.

Referring back to FIG. 5, sufficiently broad means that the planar waveguide as the transmission waveguide 460 is wide enough so that its unguided fundamental mode does not change in mode width 564' [width of mode is a function of the width of waveguide 564] significantly over typical distances of interest (e.g. up to about 3 mm for these devices). Hence, over the distance of interest the laterally unguided beam (e.g., the mode that propagates around the inventive cylindrical fiber resonator as the resonating waveguide 10 without lateral confinement) does not spread dramatically (e.g. by more than 5%). Since the guided mode is so broad in the lateral direction, it experiences minimal diffraction as it propagates around the resonator 10, and therefore no lateral guiding structure is required for the resonator. The value of using a sufficiently broad orthogonally-oriented planar waveguide on a planar substrate is that the broadness eliminates the need for additional lateral guiding structures on the cylinder (e.g. Bragg gratings, axial-direction tapers).

Modeling of cylindrical resonator round trip losses for resonators 10 of various widths, represented by their diameter thickness 104 confirms this approach. For the fiber cylinder diameter under consideration (125-250 um), the width 564 of the planar waveguide as the transmission waveguide 460 is preferably in the neighborhood of 200 um wide (or wider) for a minimum width to act as a broad planar waveguide for wavelengths around 1.55 um. The actual value depends on what round trip loss is acceptable for the desired resonator. A narrower beam (such as 50 um wide) will diffract more laterally as it propagates around the resonator 10, resulting in higher round trip losses. A broader beam (such as 400 um wide), would diffract very little, resulting in lower round trip losses and the potential for higher Q values.

An ideal high round trip transmission value of about 1.0 assumes that losses due to lateral mode spreading are small. However, lateral mode spreading can occur when light from a narrow planar waveguide is launched into a cylindrical resonator. As the mode propagates around the slab waveguide on the surface of the cylinder, lateral spreading occurs via diffraction that makes the mode field wider when it returns to the coupling region 470 of FIG. 4. The wider mode field introduces losses because of mode field width mismatch and minor phase front mismatch to the guided planar waveguide mode and the original cylindrical resonator mode field. This loss contributes to the round trip loss experienced by the field traversing the surface of the cylindrical waveguide.

Figure 6:
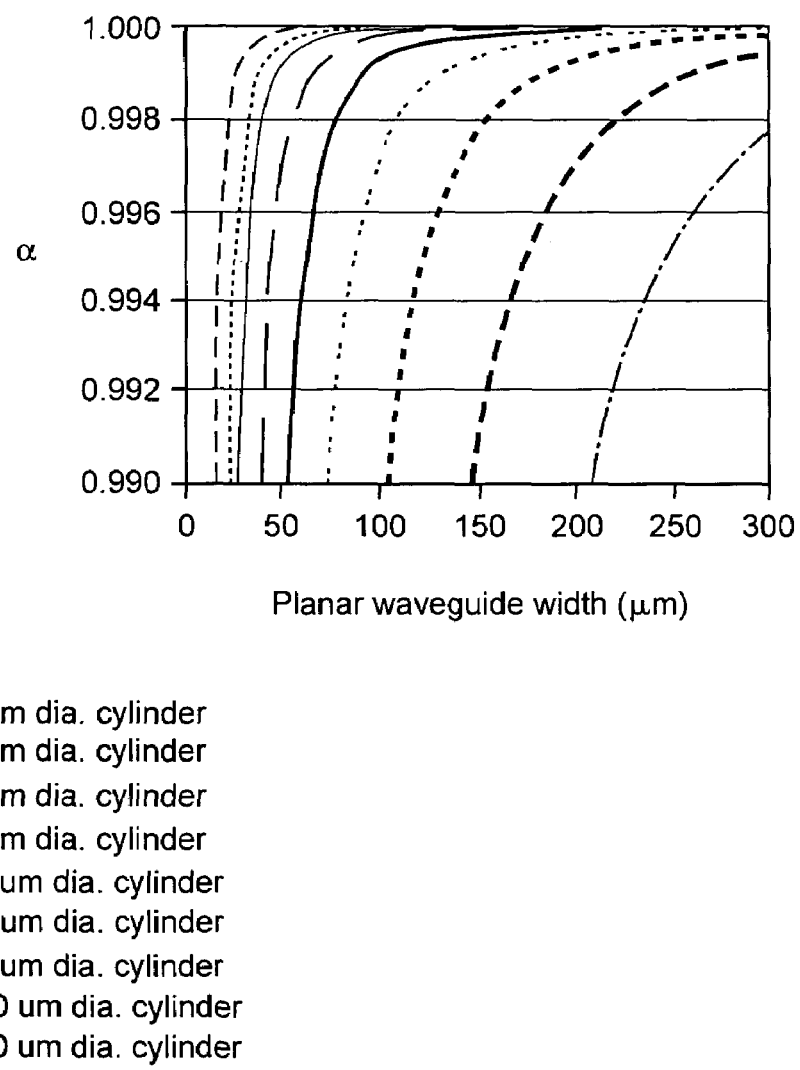
FIG. 6 is a graph of round-trip transmission ($\alpha$) for several cylinder diameters 104 of FIG. 1 versus the planar waveguide width 564 of the transmission waveguide 460 of FIG. 5.

Referring to FIG. 6, a plot of round trip transmission versus planar waveguide width 564 shows the trade-off between the planar waveguide width (or its broadness) and round trip transmission for cylinders of various diameters modeling how the width of the unguided beam propagates around the cylinder. Calculated values of round trip transmission $\alpha$ are provided for several cylinder diameters 104 of FIG. 1 as a function of planar waveguide width 564 of FIG. 5. The plot shows that for planar waveguides wider than 250 µm, lateral mode field spreading losses are negligible for cylinders up to 2 mm in diameter, even when the y-axis scale is expanded by showing values for round trip transmission $\alpha$ between 0.99 and 1.00. The plot shows that for cylindrical resonators with diameters 104 in FIG. 1 of 500 µm or less as the inner cladding 102, the width 564 of the planar waveguides as the transmission waveguides 460 in FIG. 5 can be as narrow as 105 µm and still allow round trip transmission $\alpha$ values of 0.99 or greater. This is an important result because it indicates that round trip losses due to lateral mode field spreading can be managed via practical planar waveguide dimensions.

Hence, as the mode propagates around the slab waveguide 460 on the surface of the cylinder, sphere, or other resonating waveguide 10, lateral spreading occurs via diffraction that makes the mode field wider when it returns to the coupling or interaction region 470. FIG. 6 shows that to achieve round trip losses of less than 0.1% ($\alpha$=0.999) using fiber cylinders with diameters of 500 µm or less, the slab waveguide 460 must be at least 180 µm wide.

Modeling of the circumferential modes that propagate in the thin dielectric layer of the ringed-core 120 of FIG. 5 using BeamPROP software from RSoft, Inc. were done for two cases, both for glass fibers, with inner cladding n 151 taken as 1.445, ring core thickness 124 of 2.0 um, operating in air (with n 153 approximately 1), and with wavelength of 1.55 um. For a dielectric coating as the ringed-core 120 deposited on the outer surface of a 125 um diameter fiber as the inner cladding 102, the minimum index delta to ensure that energy in the ringed core 120 does not couple whispering gallery modes is about 2.0% where the formula for index delta (%) is [(ring core index value−inner cladding index value)/inner cladding index value].

In the second case, for a dielectric coating as the ringed-core deposited on the outer surface of the 500 um diameter fiber as the inner cladding, the minimum index delta to ensure that energy in the ring core does not couple into whispering gallery modes is about 4.0%.

Figure 2:
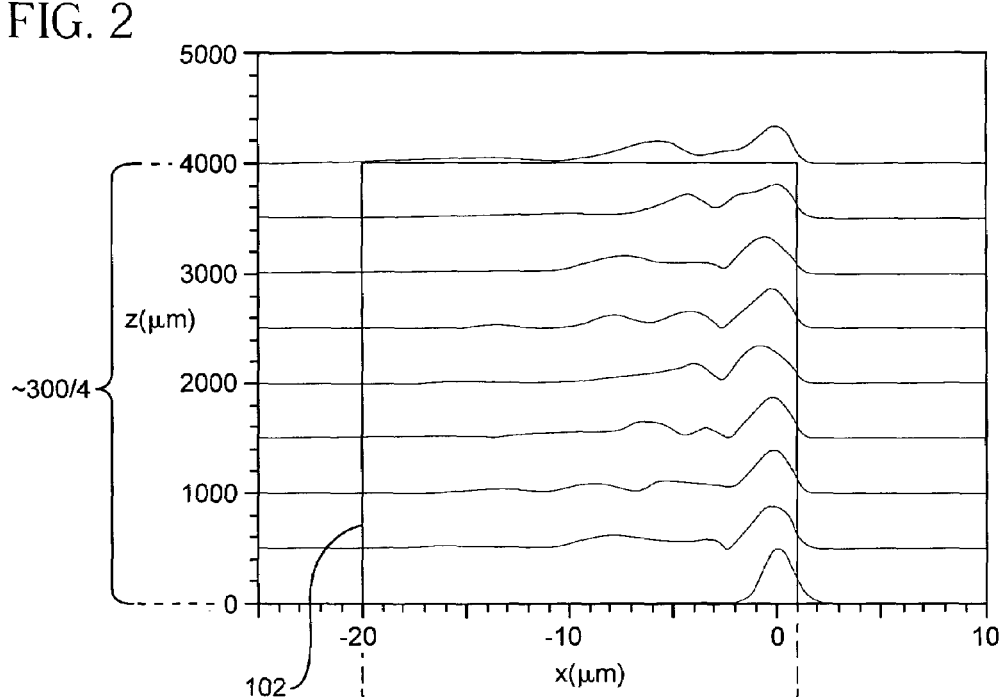
FIG. 2 is a mode propagation representation of the inner cladding 102 of the resonator 10 of FIG. 1, in accordance with the present invention.

Referring to FIG. 2, a plot of how energy is coupled into whispering gallery modes from a Gaussian beam launch profile near the surface of a 500 um diameter fiber as the inner cladding 102 is shown. FIG. 2 appears to show propagation in a straight slab waveguide in the rectangular area, but the coordinate system has actually been transformed from polar to rectangular so that the x-direction represents the radial distance (with x=0 being close to the surface of the fiber resonator 10 and x=−20 being towards the interior). The z direction represents circumferential propagation along the surface of the fiber as the inner cladding 102 existing by itself as the resonator 10.

Figure 3:
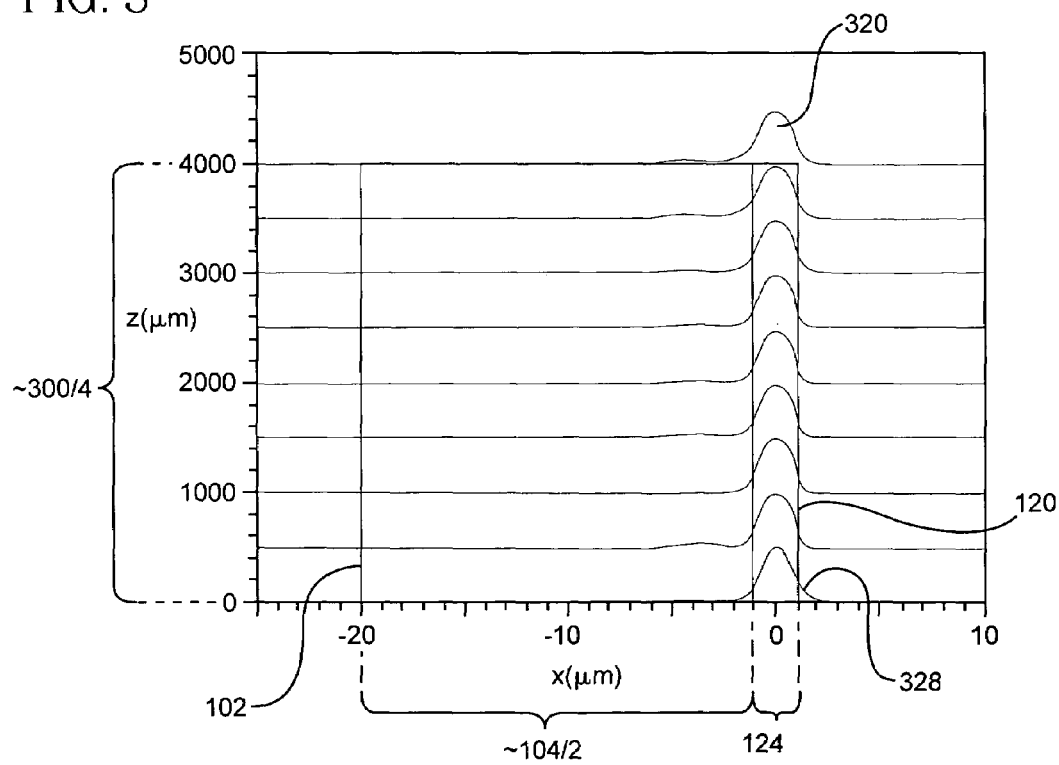
FIG. 3 is a mode propagation representation of the inner cladding 102 and the surrounding ringed-core 120 of the resonator 10 of FIG. 1, in accordance with the present invention.

Referring to FIG. 3, the same inner cladding of FIG. 2 having a first average index of refraction supporting the whispering-gallery-modes is represented by the larger rectangular area. However, a much thinner ringed-core rectangular region is added and represents the ringed-core surrounding the inner cladding of FIG. 2 which is sufficiently thin and having a second average index of refraction greater than the first average index of the inner cladding for supporting an index-guided resonant optical circumferential or other tangential mode 320 having a mode index of refraction greater then the average index of the first average index of refraction of the inner cladding. Thus, when the ringed-core region 120 is created at the surface of the fiber, with a thickness of 2.0 um and 4.0% delta, the same launched energy remains confined to the region near the surface.

In both cases, higher delta ring cores can be used, but this can result in multimode guiding in the ringed-core (depending on the core thickness), which may or may not be desirable depending on the specific application.

Even though ring core thicknesses of 2.0 um were modeled, thicker ring core layers are also possible. For example, for the 500 um diameter fiber, at 4% delta, the waveguide can be made 4.0 um wide as the ringed-core thickness and still support only one mode according to simulation results. This is an interesting effect because normally a wider core with this index delta would be multimode. The bending surface of the ring core may also help in stripping out higher order modes, which could be advantageous in minimizing resonant modes for a sharper beam width.

For cylindrical fiber resonating waveguides in the 1% to 5% delta range, the core ring thickness is preferably in the 1 um to 10 um range. For cylindrical fiber resonating waveguides in the higher delta above 5% (including high index waveguide materials with n around 2.5 to 3.3) such as Silicon oxynitride, Si, GaAs, etc.), a thinner ring core thicknesses, from 0.2 um up to 10 um is preferable.

A way to differentiate the dielectric guiding layer resonator approach of the ringed-core from whispering gallery modes resonators is based on the effective indices of the modes. Mode simulations were modeled with the same previous two structures:

$1^{st}$ case) 125 um diameter fiber as the glass inner cladding (n=1.445) and 2 um thick ring core layer (delta n=2%), surrounded by air.

$2^{nd}$ case) 500 um diameter fiber as the glass inner cladding (n=1.445) and 2 um thick ring core layer (delta n=4%), surrounded by air.

In both cases, the structures supported both whispering gallery modes and dielectric ring core modes. Modeling results confirmed that the single dielectric ring core mode had an effective index value between the index of the ring core and the glass inner cladding. On the other hand, the multiple whispering gallery modes all had much lower effective indices between the index of the glass inner cladding and the index of the surrounding air.

Thus, from largest to lowest index the following list results:
dielectric ring core layer index
guided dielectric layer mode effective index
glass inner cladding index
whispering gallery mode effective indices
air outer cladding index For the 125 um diameter fiber some values are:

| | |
|---|---|
| Dielectric ring core layer index | 1.513 |
| Guided dielectric layer mode effective index | 1.485 |
| Glass inner cladding index | 1.445 |
| Whispering gallery mode effective indices | 1.428 |
| | 1.414 |
| | 1.401 |
| | 1.391 |
| | 1.386 |
| | 1.380 |
| | 1.371 |
| Air outer cladding index | 1.003 |

For the 500 um diameter fiber some values are:

| | |
|---|---|
| Dielectric ring core layer index | 1.484 |
| Guided dielectric layer mode effective index | 1.471 |
| Glass inner cladding index | 1.445 |
| Whispering gallery mode effective indices | 1.416 |
| | 1.386 |
| | 1.370 |
| | 1.347 |
| | 1.322 |
| | 1.300 |
| Air outer cladding index | 1.003 |

The effective indices for the whispering gallery modes are rather closely spaced compared to the difference between the guided dielectric layer mode effective index and the effective index of the lowest-order whispering gallery mode. There is an advantage to having the guided dielectric layer mode effective index "set off" or differentiated in value from the set of whispering gallery mode effective indices. Because coupling between an external mode and a resonator mode depends in part on how well the internal and external mode propagation constants match, a larger effective index mismatch implies poorer coupling to whispering gallery modes (with everything else such as mode field shapes being the same). This is desirable as it minimizes the amount of energy coupled into whispering gallery modes (both in the internal-external interface coupling region and in propagation around the ring) to form one single sharp resonant peak.

One important teaching of the present invention is that by adjusting the ring core index it should be possible to engineer a guided dielectric layer mode with an effective index matching that of an optical mode existing in the planar waveguide 460. These planar waveguides 460 could be designed to be weakly guiding (e.g., low core-cladding index delta), so that they would have wider or broader fundamental modes (e.g., 8-10 um) for improved coupling to standard SMF-28® fibers, available from Corning.

The lack of lateral mode confinement structures in the inventive design greatly simplifies the resonator fabrication process over the complex methods described in U.S. patent application 2002/0081055 and U.S. patent application 2002/0044739, and significantly relaxes alignment tolerances in assembly of the inventive resonator devices (over resonators described in U.S. patent application 2002/0081055 and U.S. patent application 2002/0044739 and U.S. Pat. No. 6,583,399).

Fabricating multi-layer fiber resonators through well-known fiber drawing processes with the desired index profile produces an actual guiding layer in the ringed-core 120 around the fiber circumference in the radial direction. This radial mode control is unique. Whispering gallery mode resonators (and even "circumferential-mode" resonators defined or used to mean whispering gallery mode) rely on the curvature of the resonating cylinder alone, without the index profile of the inner cladding, to guide the optical mode. The teachings of the present invention is to have the optical mode guided by physical waveguide layers of varying refractive indices.

The lack of a need for lateral mode control in the inventive resonating fiber or fiber resonator 10 is also unique. The U.S. patent application 2002/0081055 and U.S. patent application 2002/0044739 rely on extreme fabrication techniques to either directly machine, etch, deposit, or dope lateral confinement areas on the resonating cylinder. These require several non-value added steps in manufacturing, and they also require precise alignment during assembly.

In contrast, the designs in the inventive fiber resonator 10 have much better manufacturing tolerances. The advantage of the fiber resonator is that it can be fabricated to high mechanical tolerance and material index control using traditional fiber draw fabrication techniques. A single fiber draw can produce thousands or millions of cylindrical resonator devices with near identical physical and optical properties. This is in contrast to the precision thin film deposition techniques required for fabrication of planar and thin film resonator filters. Thin film thickness and material variations within each wafer and from wafer to wafer introduce shifts in resonator filter performance that necessitate physical or thermal tuning steps for accurate filter calibration.

Figure 9:
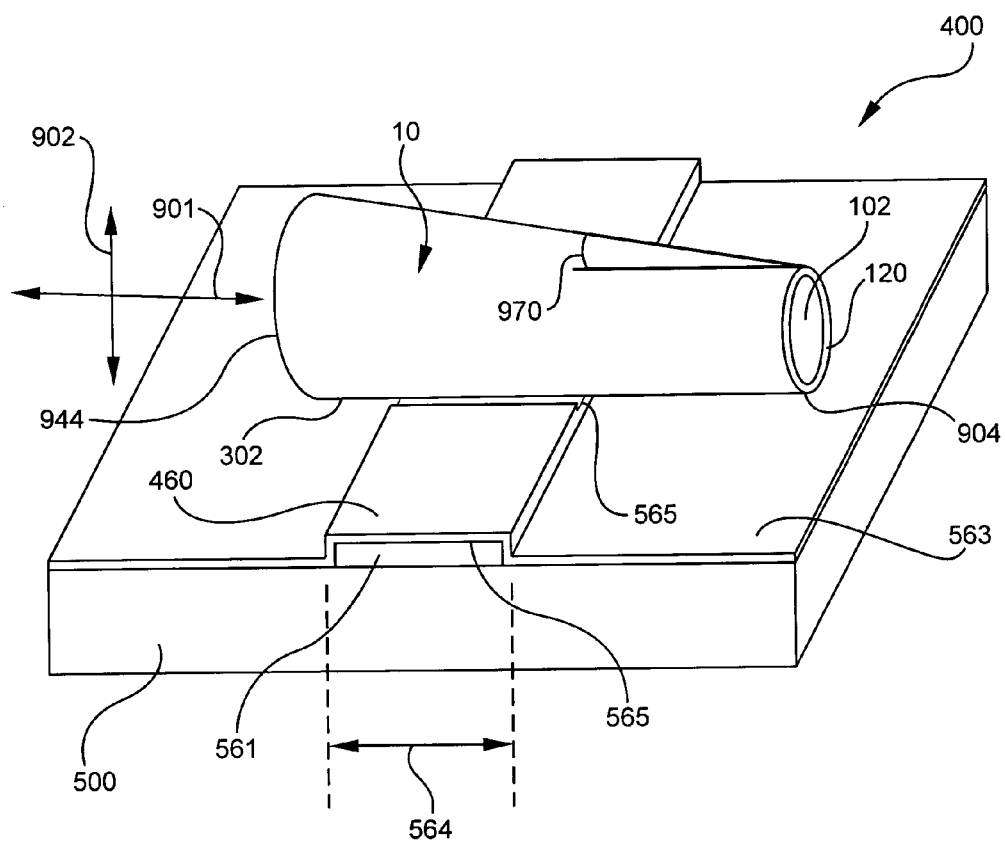
FIG. 9 is a perspective view of the resonator 10 having a tapered conical shape 302 of FIG. 1 and evanescently coupled with a planar waveguide as the transmission waveguide 460, in accordance with the present invention.

Referring to FIG. 9, another example out of a variety of cross-sections possible for the resonating waveguide 10 is shown as a cylindrical closed-loop shape tapering at an inclining or coupling angle 970 on at least one arcuate side of the surface 300 or in other conical shapes 302 of FIG. 1. The tapered resonating fiber 10 has minimum and maximum fiber diameters 904 and 944, respectively, at each end of the taper. The tapering of the diameter allow precise resonant wavelength selection or other types of resonance wavelength tuning for different sensing/device applications are possible, such as tunable filtering, lasers etc.

The filtering applications using a tapered fiber for the fiber-slab resonator embodiment of the orthogonal resonating coupler 400 of FIG. 4 is one possible variation instead of using a cylindrical fiber as the resonating waveguide 10 or more specifically as the inner cladding 102. The surface coating on the taper would be similar to the coatings used on cylindrical fibers for providing the ringed-core 120.

An advantage of tapered fibers 10 for fiber-slab resonators 400 in FIG. 9 is that many resonators with slightly different resonant wavelengths due to different diameters can be fabricated on the same planar substrate 500 where the planar waveguides may also vary in width for resonance tuning.

Figure 7:
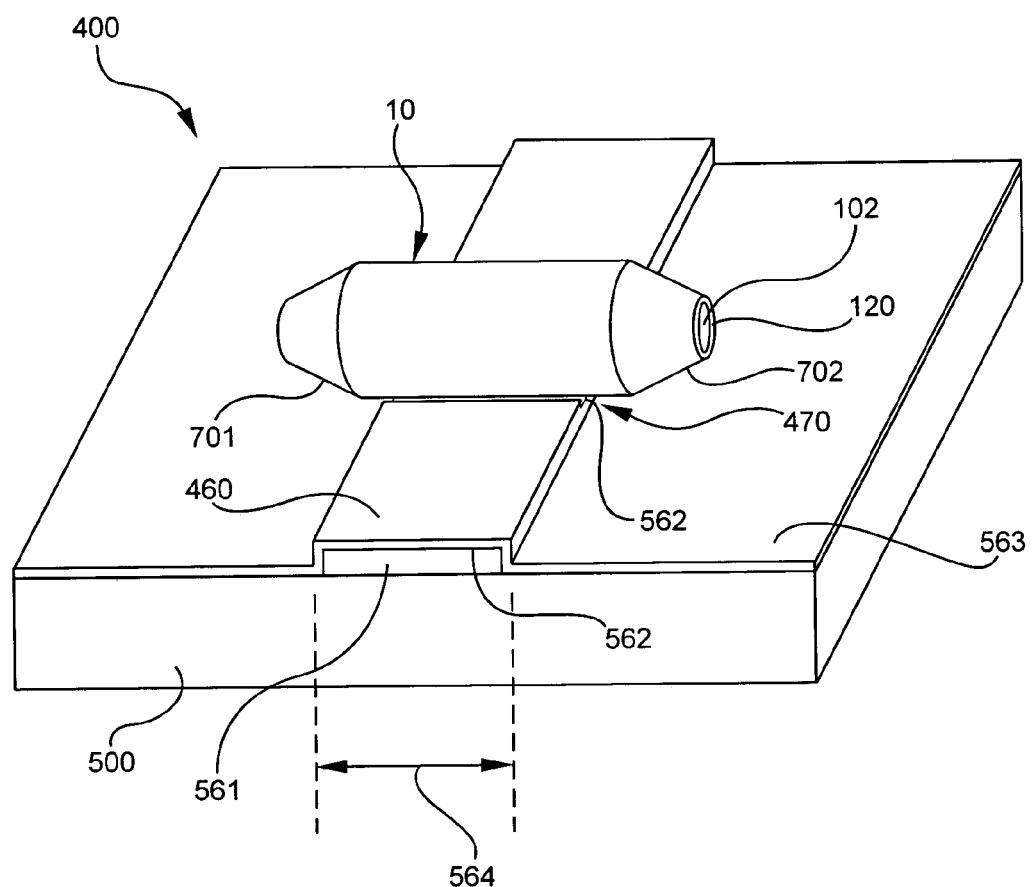
FIG. 7 is a perspective view of the resonator 10 of FIG. 1 having its ends tapered for lateral guiding and evanescently coupled with a planar waveguide as the transmission waveguide 460, in accordance with the present invention.

In general the tapered fibers of FIG. 9 or of FIG. 7 could be fabricated using the same fiber fabrication methods for the cylindrical resonating fiber of FIG. 1. An additional controlled taper draw step on these fibers would establish a uniform reduction in the diameter of the fiber per unit length over a limited portion of the taper.

These tapers could then be mounted on planar substrates 500 over slab waveguides 460, in regions where the slab waveguide overclad layer was locally reduced or eliminated in the interaction region 470. The tapered fiber 10 could be mounted on the substrate 500 using adhesives near the ends of the fiber taper 10, or using other attachment techniques such as polymer fiber grippers 1270 of FIG. 12. The tapered fiber 10 could also be aligned to the planar waveguide using alignment features machined into the substrate 500 (i.e., v-grooves, trenches, steps or mesa regions).

A key advantage of using tapered fiber-planar waveguide resonators 400 is that they allow resonance wavelength fine tuning. This tuning operation can be performed at component assembly time to compensate for index and thickness process variations, or it can be exploited to create devices that can be tuned in operation.

The tapered fiber 10 can be moved along its axial direction or laterally to modify the optical path length of the resonator section directly over the slab waveguide 460. The fiber or cylinder can be physically tapered or optically tapered by index of refraction profiling. Axial movement of the taper can be performed manually at assembly time, or actively during device operation via an external actuator.

A temperature-compensated tapered fiber-planar waveguide resonator could be constructed by mounting the taper on a block or arm that moves the taper axially with temperature changes. The coupling coefficient between the slab and the tapered fiber could be selected to allow a small physical gap between the components. This would prevent friction and hysteresis effects between the slab 460 and the taper 10, but in practice it might be a difficult parameter to control.

In general, changes in the separation distance between the slab 460 and tapered fiber 10 adjust the bar transmission t value for the resonator. This change in bar transmission t would provide tunability of the bandwidth and depth of the filter resonant response. The tuning effect could be important in the dynamic equalizer, as the width of each wavelength channel filter passband could be adjusted to provide coverage over the ensemble wavelength band. The separation distance between the tapered fiber resonator 10 and an upper or lower substrate slab waveguide 500 can be modified for desired tuning. For example, the tapered resonating waveguide 10 can be moved laterally 901 across the slab transmission waveguide 460 to provide temperature compensation or wavelength tuning for use as a tunable or temperature compensated filter (via filter center wavelength). In another example, the tapered resonating waveguide 10 can be moved vertically in a direction 902 perpendicular to both the fiber longitudinal axis and the slab waveguide direction 490 of FIG. 4 to provide passband/stopband bandwidth tuning for a second substrate slab waveguide 500 placed on top and facing a first bottom substrate slab waveguide 500 in a 4-port configuration for use as a tunable or temperature compensated filter (via filter notch width). Alternatively, the tapered resonating waveguide 10 or the upper substrate 500 (not shown) can be moved vertically relative to each other in a direction 902 perpendicular to both the fiber longitudinal axis and the slab waveguide direction 490 of FIG. 4 to provide passband/stopband bandwidth in the same 4-port configuration for use as a tunable or temperature compensated filter (via filter passband width). The tuning approach could also be applied to non-tapered fiber-slab resonator devices 400 as in FIG. 13.

Fiber-planar waveguide tuning can also be implemented by locally modifying the index of refraction of the fiber core 120, cladding 130 and/or underclad 102 layers via thermo-optic tuning. For example, planar substrate heaters located near the fiber-planar waveguide resonator could provide local heating that modifies the index of refraction of one or more layers and shifts the resonant wavelength of the device. This approach could be used to implement tunable WDM (Wavelength Division Multiplexer) devices or dispersion compensators. A thermal gradient across the fiber 10 implemented using this approach could create variable tapered fiber-slab resonators 400.

An array of variable resonators could be used with planar optical circuits of more than one planar waveguide 460 to create multiplexer or demultiplexer devices with variable wavelength channel spacing and starting wavelength. Tuning the distance between the slab waveguide 460 and fiber 10 in these applications would provide control over wavelength channel passband width. In general, the approach would provide a flexible multiplexer or demultiplexer device that can be tuned to customer-specific requirements for wavelength channels, as exemplified by FIG. 14.

Along with the suitability for a variety of bio or chemical sensing, photonic applications are also envisioned, such as switches, multiplexers or modulators. Wavelengths of operation for the resonator could be between 0.6 and 1.55 um, depending on the technology used for sources, detectors and wavelengths for optimum binding layer optical changes (e.g., index, absorption change), especially for silica based material systems. However, the inventive resonator can potentially be made and used at UV and IR wavelengths beyond 200-2000 nm with other material systems. For example, fluoride or other heavy metal oxide type of materials can be used for wavelengths beyond 2000 nm. Some of the bio/chemical sensing applications need wavelengths >2 um where the inventive resonator can also be used.

Any other fibers, such as photonic bandgap, hollow-cored, or polarization, can be used as the inner cladding, internal resonator base or body as long as a thin waveguiding layer serving as the ringed-core is present on the outside of such a fiber. As long as these internal structures are at least several wavelengths away from the surface of the resonator, various fiber types can be used as the inner cladding. These variant inner cladding structures would tend to extinguish guided higher order modes, and any resulting attenuation would introduce more round trip loss. A design trade-off is needed depending on the application to balance internal fiber design and increased attenuation.

Another design trade-off involves whether a broad source of optical beam is available. In applications where narrower planar waveguide widths less than 180 µm wide are required, cylindrical lateral confinement of the fiber mode is required to limit round trip losses. The present invention teaches several techniques that could be applied to the fiber or cylinder 10 to provide lateral mode confinement. If the application requires a narrow beam, then the resonating fiber 10 can have its opposed ends processed for providing a pair of lateral confinement sections for laterally confining the guided circumferential mode in the interaction region 470.

One way for lateral mode confinement is to process (cleave or polish) the ends of the resonating waveguide 10 to provide fibers or cylinders with cleaved or polished ends. This approach may not be suitable for fibers with extremely small diameters, but fortunately in this case the round trip path is short so losses due to lateral spreading are expected to be small. Lateral mode confinement can also be implemented by reducing the diameter of the fiber or moving the cylinder 10 away from the central guiding region 470. In addition to the cleaved or polished fiber ends, the polished ends can be further flame polished for diameter reduction.

Referring to FIG. 7, the pair of lateral confinement sections 701 and 702 includes opposed tapered ends of the resonating fiber outside of the interaction region 470. A taper draw process can be used to selectively reduce the diameter of the fiber resonator 10. Hence, tapering the opposing edges of the resonant fiber cylinder 10 can be used for lateral confinement if needed such as when the planar waveguide or other transmission waveguide is not broad enough. A lateral confinement structure can result from symmetric tapering on both sides of the central waveguiding ringed-core. Hence, the opposed tapers are there primarily to provide lateral guiding of the transverse mode, so that the transverse mode does not spread in the direction parallel to the axis of the fiber during propagation around the surface of the fiber, thereby limiting roundtrip losses and allowing for higher Q values.

Instead of tapering, in another lateral mode confinement approach one or more of the ringed-core guiding 120, outer cladding 130 or inner or underclad 102 layers away from the central guiding or interaction region 470 is processed to selectively alter the index of refraction. This index change could be induced by selective UV exposure of a polymer or doped glass layer, or by controlled dip coating for addition of dielectric material or etching for removal of dielectric in these regions.

Figure 8:
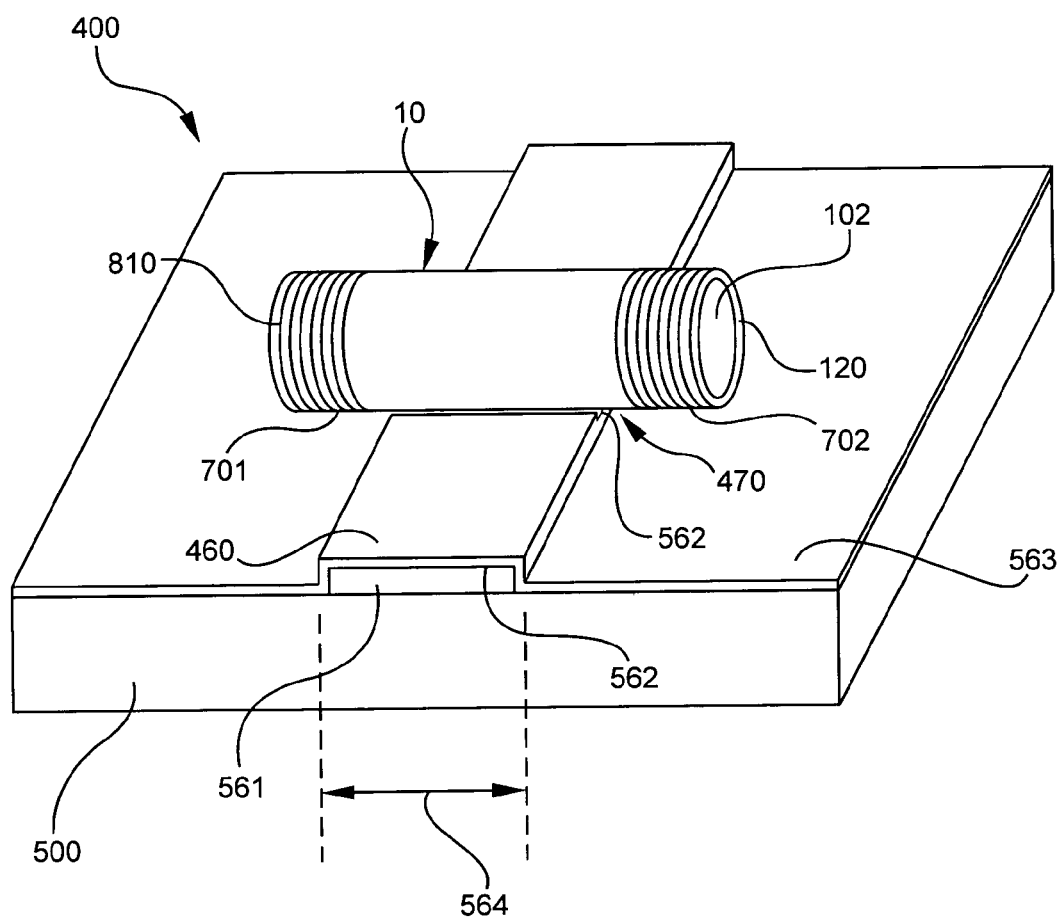
FIG. 8 is a perspective view of the resonator 10 of FIG. 1 having its ends grated for lateral guiding and evanescently coupled with a planar waveguide as the transmission waveguide 460, in accordance with the present invention.

Referring to FIG. 8, the pair of lateral confinement sections 701 and 702 includes fiber Bragg gratings 810 written on opposed ends of the resonating fiber 10 outside of the interaction region 470. The fiber Bragg gratings on each side of the resonating section of the fiber cylinder is shown to provide lateral confinement on both ends of the central waveguiding ringed-core. Gratings would be formed substantially parallel to the circumferential propagation direction of the resonating fiber. Thus, the gratings are perpendicular to the fiber axis, and the propagation direction is along the cylinder circumference.

UV exposure would then be used to write a periodic grating structure into one or more of the fiber or cylinder ringed-core guiding 120, outer cladding 130 or underclad or inner cladding 102 layers. The grating period would be selected to reflect light back toward the central guiding region 470 of the resonating fiber 10 over a limited wavelength range.

Figure 13:
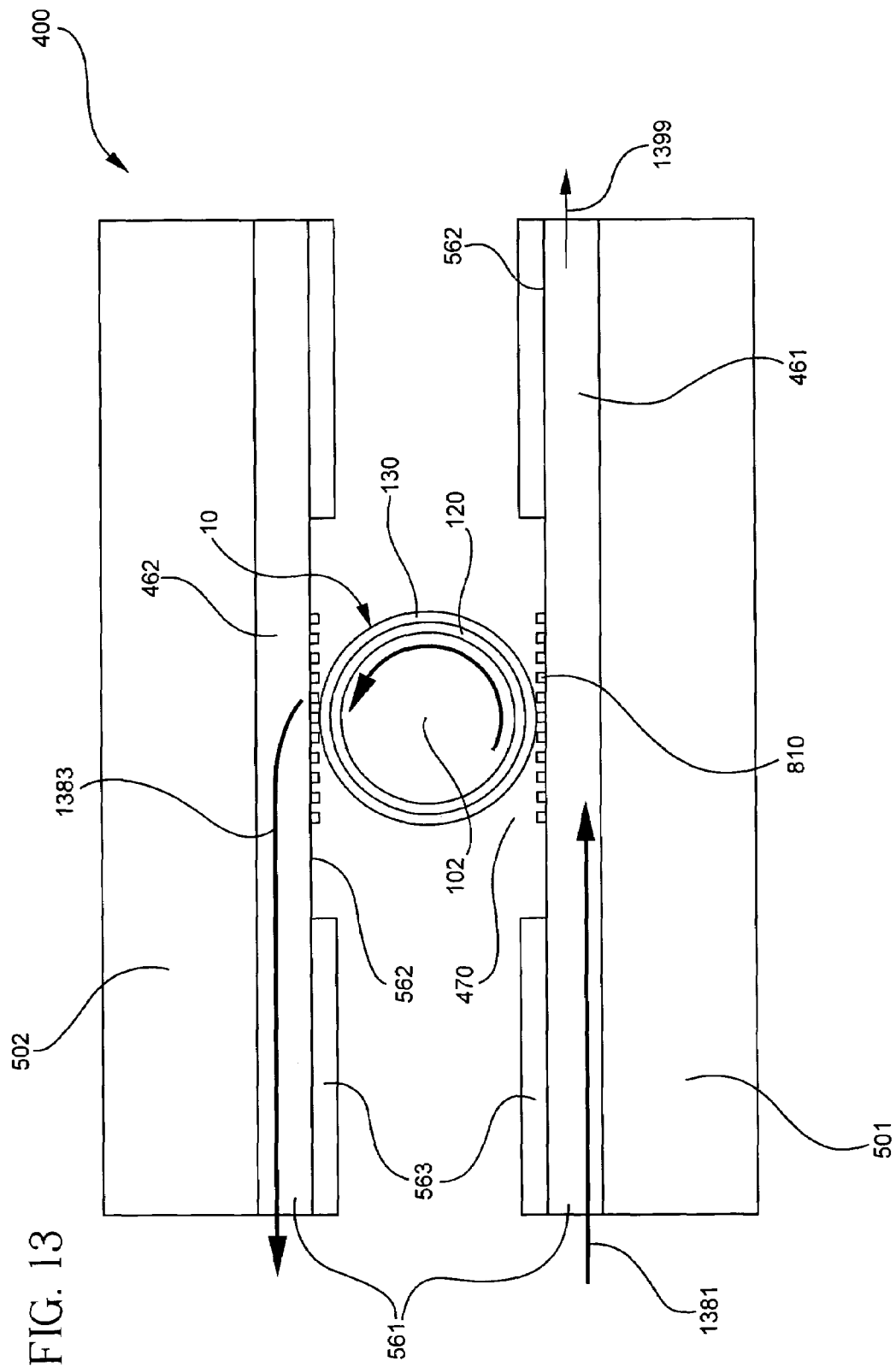
FIG. 13 is a cross-sectional view of a 4-port configuration of the resonator 10 of FIG. 1 evanescently coupled with two transmission waveguides 461 and 462, in accordance with the present invention.

Referring to FIG. 13, Bragg gratings 810 are written into the planar waveguide 461 or 462 directly or on top of the thin overclad 562 instead of on the fiber resonator 10 as in FIG. 8. By writing a Bragg grating 810 into the planar waveguide 461 or 462, coupling between the planar waveguides 461 or 462 and the cylindrical fiber or spherical resonator 10 is modified. For example, the spectral response of the resultant orthogonal resonating coupler 400 could be sharpened by adding the Bragg grating 810, since coupling could be enhanced at the resonance wavelength or defeated at nearby wavelengths. The Bragg grating 810 could also be chirped to scatter light out of the slab waveguides 461 or 462 at different angles along the propagation light path at resonance 1383. These scattering angles could be selected to reduce the mode field phase front angular misalignment between the guided slab waveguide mode. Smaller phase front angular misalignments would result in improved coupling between the slab waveguides 461 and 462 and the cylindrical fiber or microsphere resonator 10.

The sharpness of the resonance response is related to the values of the round trip transmission α and the directional coupler bar state transmission t. Small changes in either of these parameters result in dramatic changes in the resonance response. In a practical resonator device, the value for t is close to unity, while the directional coupler cross state transmission K is close to zero. Small directional coupler cross state transmission K values are associated with larger separations between the slab waveguides 461 and 462 and the resonating waveguide 10. The integral that helps determine K involves the overlap of exponentially-decaying tails of the slab waveguides 461 and 462 and resonating waveguide mode fields. As a result, small changes in the separation distance between the mode fields result in large changes in the value for K and therefore large changes in the resonance response for the device.

To minimize the sensitivity of the orthogonal resonating coupler 400 to small changes in slab-fiber separation distance, the Bragg grating 810 could be designed to scatter slab waveguide light non-uniformly as a function of angle and axial position along the slabs 461 or 462. As the resonating waveguide 10 is moved away from the slab waveguides 461 or 462, coupling with light scattered near the at least one of the slab waveguides 461 or 462 decreases. At the same time, the resonating waveguide 10 also intersects light that was scattered from a slab waveguide Bragg grating 810 positioned further away from the resonating waveguide 10. By properly selecting the scattering intensity and angle as a function of axial position along the slab waveguides 461 and 462, the uniformity of planar waveguide-to-fiber coupling over a limited range of slab-fiber separations improves. A design trade-off involving uniformity and total coupling loss is necessary, since for all cases some of the slab waveguide scattered light will not couple into the resonating waveguide surface propagation mode. Fortunately strong coupling is not required between the slab waveguides 461 and 462 and the resonating waveguide 10, so the overall optical losses should be small for the resonant systems under consideration.

Gratings are generally made by introducing any kind of local periodic change in the effective index of the waveguide guided mode, be it an index change in the core layer 561, in the cladding layer (above or below the core 561), or due to a rapid change in the thickness of the waveguide core or cladding that induces a guided mode effective index change. What the guided mode field must "see" is the change in material index for the grating to work. The top thick overclad 563 can be of the same material as the thin overclad 562. With whatever material, it is important that the top thick overclad 563 is removed to leave only a thin overclad 562 in the interaction region 470. For example, if the top thin overclad 562 is sufficiently thick, the mode field goes to approximately zero at the surface of the top thin overclad 562. This is the normal case, since if the mode field did not approach zero then there will probably be significant scattering losses at the top surface of the thin overclad layer 562. The grating 810 needs to be placed in a region where the guided mode field is non-zero. This should be the preferable case where the grating 810 is fabricated on the thin overclad layer 562 directly on top of the guiding core 561. In general, thin could be defined as less than 0.5 times the width of the guided mode, while thick could be defined as greater than three times the width of the guided mode.

With or without gratings 810, the 4-port configuration of FIG. 13, instead of the 2-port configuration of FIG. 4, can be used as the resonant systems under consideration for various applications of the orthogonal resonating coupler 400. Thus, in general, coated optical fibers as the resonating waveguides 10 can be mounted between planar waveguide substrates 501 and 502 to create 4-port ring resonator devices. Light input 1381 on the left side of the lower substrate 501 is coupled into the fiber resonating waveguide 10 at resonance, and coupled into the upper substrate waveguide 502. At wavelengths away from resonance, light input 1381 on the left side of the lower substrate 501 continues straight through and exits on the right 1399. In this configuration, the resonator acts as a wavelength notch filter. Using the light output 1383 from the upper substrate 502, this structure could be used to implement a 4-port source filter.

If the ringed-core 120 of the resonating waveguide 10 is actively doped with a rare-earth ion, gain layer pumping could also be employed using the 4-port fiber-slab resonator configuration of FIG. 13. Optical signals would be guided in the lower substrate 501, and an optical pump light is guided in the upper substrate 502. In general, the directional coupler structures that guide light between the slabs 461 and 462 and the resonating fiber surface mode are wavelength dependent. This feature is exploited to design the upper directional coupler 502 so that it only couples pump light, and the lower directional coupler 501 so that it only couples signal light. In this way the upper and lower couplers 502 and 501, respectively, would serve as wavelength division multiplexers (WDMs) similar to the Corning's MultiClad® WDM couplers used in Erbium doped fiber amplifiers using fibers. The diameter of the fiber for the resonating waveguide 10 could be selected to support resonant conditions for both the pump and signal light. The resulting device 400 would provide high optical gain over a very narrow wavelength, or over a set of signal channel wavelengths.

Used in the 4-port resonator configuration, this rapid tuning would turn the orthogonal resonating coupler 400 into a high-speed optical switch. Other applications could use the electro-optic fiber coatings in the ringed core 120 or in the outer cladding 130 in high-speed narrowband filters. These filters could be used as part of a tunable narrowband laser source or in a high-speed spectrometer system. Other devices, such as polarization splitters and controllers, could be fabricated using such a tunable 4-port fiber-slab resonator configuration.

Referring to FIG. 14, the tapered fiber resonator 10 of FIG. 9 is used in the 4-port configuration of FIG. 13, without the gratings 810. The orthogonal resonating coupler 400 could be used as a multiple-port wavelength demultiplexer based on the tapered optical fiber 10 of FIG. 9 mounted between two transmission waveguide substrates, where the lower substrate 501 is shown with its planar waveguide 461 underneath and the upper substrate is overlaid with its planar waveguide 462 overlaid on top. The upper substrate 502 with its integrated planar waveguides 462 could be mounted directly over the lower substrate 501 with its integrated planar waveguides 461 at an inclining angle between the two substrates 501 and 502, dictated by the coupling angle 970 of the tapered fiber 10 of FIG. 9. However, the planar waveguides 461 and 462 with its varying widths widening for a range of selected resonances are shown slightly off-set instead of being in a perfect overlap to be able to see the top and bottom transmission waveguides 462 and 461, respectively.

The structure of FIG. 14 therefore forms a 4-port fiber-slab resonator similar to the one shown in FIG. 13. Broadband light $1464_1$, including a set of wavelengths $\lambda_1$-$\lambda_6$, enters the orthogonal resonating coupler device 400 at an input port shown in the upper left corner of the device 400. Light propagates to the right where it couples with the tapered optical fiber 10. The diameter of the tapered fiber 10 is selected so that wavelength $\lambda_1$ is at resonance, resulting in light of wavelength $\lambda_1$ being coupled out of the tapered fiber 10 and into the upper substrate waveguide 462. This narrowband wavelength $\lambda_1$ light is guided by the upper substrate waveguide 462 to the left where it exits the upper substrate 502. The remaining light in the lower waveguide 461 follow a 180° waveguide bend that directs the light back into the tapered fiber 10 at a location where the diameter of the resonating fiber 10 is different. Therefore a different wavelength ($\lambda_2$ in this case) is coupled into the tapered fiber 10 at resonance, where it is then coupled into an upper substrate waveguide 462. This process is repeated for the remaining four wavelengths, and any unextracted light $1464_2$ exits the lower substrate 501 near the lower left corner of the device 400.

The wavelength demultiplexer could be fabricated with all wavelength outputs appearing on one side of the substrate using tight planar waveguide bends on one layer. Such a one-sided architecture simplifies assembly of more complex devices such as a wavelength channel monitor where a detector array would be aligned to all of the narrow band outputs on an output side of the planar substrate. Light from each wavelength output would be coupled into a separated detector, providing information on the power in each wavelength channel.

Multi-port wavelength demultiplexer devices can also be laid out using a spiral waveguide pattern in the slab waveguides 461 and 462. Depending on the minimum bend radius allowed for the planar waveguides, this approach might reduce the overall size of the planar demultiplexer device.

The multi-port wavelength demultiplexer layout of FIG. 14 can be extended to form more complex filtering devices, such as a dynamic gain equalizer device. The slab waveguide layout would provide a wavelength demux on one side and a mux on the other side. An array of broadband Variable Optical Attenuators (VOAs) in between two taper fiber resonators 10 could be fabricated on the same substrate to provide wavelength channel power grooming on a channel-by-channel basis.

For applications where it is desirable to have the device input and output waveguides on a common substrate, other zigzagging or meandering layouts are possible. An upper substrate 502 would be used to guide light for each wavelength channel between a left tapered fiber to a right tapered fiber.

Such tapered fiber-slab resonators 400 of FIG. 14 are still practical even evaluated against round trip losses. In a cylindrical fiber-slab resonator of FIG. 5, the mode field coupled into the fiber resonator 10 from the slab waveguide 460 propagates around the fiber resonator 10 and arrives back at the slab waveguide 460 with zero angular or lateral offset. Similar propagation around a tapered fiber 10 of FIGS. 9 and 14 introduces both lateral and angular offset when the beam recombines with the slab waveguides 461 or 462 in a 4-port configuration of FIG. 9 or a single slab waveguide 460 in a 2-port configuration of FIG. 9. Lateral and angular offset of the beam will introduce a coupling loss that depends on the width of the beam. The amount of lateral and angular offset depends on how tapered the fiber resonator 10 is.

Three different tapering approaches were simulated. Each approach has a taper length of 5 mm in the tapered fiber resonator 10 of FIG. 9, but having different minimum and maximum fiber diameters 904 and 944, respectively, at each end of the taper. Nominal fiber diameters examined were 12.5 μm, 125 μm and 500 μm as the minimum fiber diameter 904 or 104 in FIG. 1. Smaller fiber diameters result in fiber-slab resonators with low orders of modes and large Free Spectral Ranges (FSRs). For example, the first fiber taper in the following table has an FSR that spans the telecommunications C-band (1528-1563 nm):

In U.S. Pat. No. 6,583,399 lateral mode minimization is directly coupled to the diameter of the sphere, so designers may have less freedom to select a small sphere diameter that would provide better mode minimization.

According to the teachings of the present invention, the adiabatic taper of the planar waveguide ensures that only a single broad lateral mode is excited in the cylindrical or fiber waveguide for providing single-mode lateral operation. Serving as a collimator-based thin film filter, such a tapered planar waveguide can be made to mimic the operation of an optical collimator in the lateral direction, while core-cladding index differences provide transverse mode confinement. Such a collimating "lens" could be fabricated by patterning a planar waveguide so that it is wide at one end (e.g. >200 um) and less wide at the other, with a sufficiently low taper angle (e.g. <1 degree) in between.

When the planar waveguide is thus broadened adiabatically, only the fundamental mode of the wider waveguide is excited—even though the wider waveguide will support many modes. This is important to eventually couple the tapered planar waveguide to a single-mode fiber (e.g., SMF-28 fiber available from Corning). This single-mode fiber could be coupled into a small size tapered planar waveguide (e.g., 6 um×6 um cross-section for 0.75% delta waveguide or 2 um×2 um for a 17% delta waveguide), which supports only a single mode.

In the previously mentioned '055, '739, and '399 patent/applications, radial mode minimization for single mode radial operation is provided by keeping the radius of the cylinder or sphere relatively small to enhance optical path bending. Still, it is possible for more than one whispering gallery mode to be excited, reducing the Q of the filter through multimode filter band broadening by such multiple or comb Table of Order, Wavelength and FSR calculations for several different fiber tapers (using single mode waveguides on surface of fiber taper with $n_{eff} = 1.51$).

| Minimum fiber diameter (um) | Maximum fiber diameter (um) | Taper length (um) | Order | Lambda min (nm) | Lambda max (nm) | FSR (nm) | Coupling angle (deg) |
|---|---|---|---|---|---|---|---|
| 12.5 | 12.9 | 5000 | 39 | 1520.48 | 1569.13 | 48.66 | 0.0144 |
| 125 | 125.35 | 5000 | 388 | 1528.31 | 1532.59 | 3.95 | 0.0126 |
| 500 | 500.35 | 5000 | 1552 | 152.83 | 152.94 | 0.99 | 0.0126 |

Simulation results show that the round trip coupling angles 970 resulting from these tapers are all less than 0.015°. For propagating beams with widths of 180 μm or less the coupling loss due to this angular offset is <0.02 dB. Similar analysis of lateral offsets due to fiber tapers 10 (not shown) resulted in negligible coupling loss contributions.

While it is important to provide low round trip losses using appropriate mode confinement methods, another critical issue for good high-Q resonator performance is single-mode operation. This involves fabricating the resonator guiding structure to support only one lateral (or azimuthal) and one radial (or transverse) mode.

In U.S. patent application 2002/0081055 and U.S. patent application 2002/0044739 minimization of lateral modes is accomplished by reducing the width of the resonator rib structure and reducing the radius differential between the guiding rib and the unguided adjacent regions. This requires precise control of cylindrical resonator material removal in regions away from the rib.

of resonances. Further, the Q may be reduced since light coupled into any unwanted modes may introduce additional round trip losses.

In contrast, the inventive fiber resonator can be fabricated to support exactly one radial mode for single mode radial operation through proper selection of dielectric layer thicknesses and indices of refraction. This dielectric layer can be fabricated accurately with existing fiber draw fabrication methods. Standard optical fiber fabrication techniques enable precise control of optical fiber outer diameter and dielectric layer properties (thickness and index) required to target specific resonator wavelength responses, and provide a low-cost method for fabricating cylindrical resonators with dielectric layers. Such fiber resonators could provide effective index sensitivities on the order of $10^{-7}$ RIN (refractive index units).

The proven fiber re-drawing techniques allow precise control of the material optical properties and radial thicknesses. The dielectric layers for waveguiding, mode control or other types of control can be coated on or more preferably they can be drawn with the rest of the fiber/cylinder cross-section. The deposition/fabrication method depends on what the coating material is.

Also, fiber coating techniques or similar methods can be used to deposit controlled thicknesses of organic films on the cylinder/fiber surface. A binding agent coating could take place after all required high-temperature glass forming processes, such as flame-polishing and grating fabrications are done.

The optical fiber or cylinder body made-up preferably by a fused silica core 102 can be coated with a binding agent in the binding layer 33 that changes one or more optical properties (e.g., index of refraction, optical loss) when specific chemical species bind to its surface during chemical or biological sensing. If the glass fiber alone has its inner cladding 102 coated directly with a binding agent coating, the guiding structure at the surface of the cylinder of the inner cladding 102 alone does not fully confine the mode in the radial direction. Hence, multiple (lossy) whispering-gallery-modes can be supported by such a structure of the inner cladding 102 alone. In operation, this structure will result in multiple resonance peaks from the whispering-gallery-modes, with less power in each peak than a comparable single-mode fiber resonator.

Figure 10:
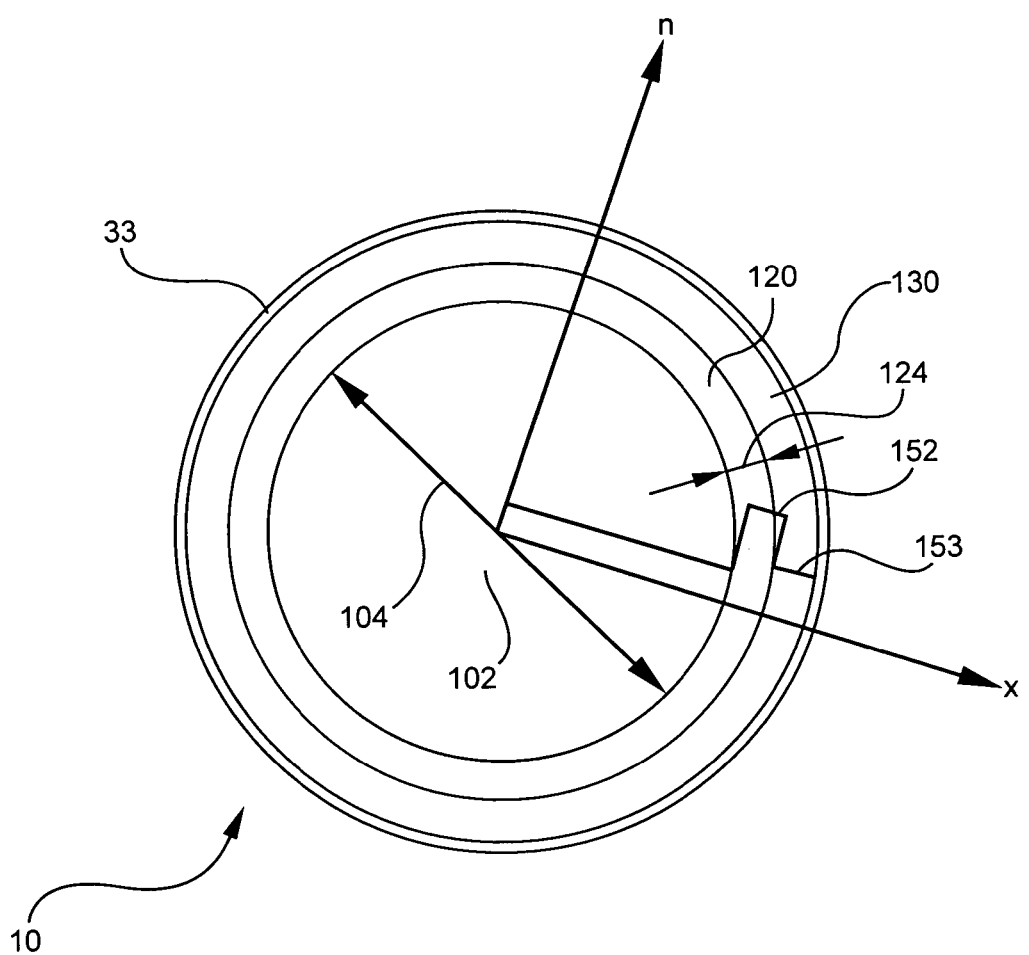
FIG. 10 is a cross-section view of the resonator 10 of FIG. 4 with the addition of a binding agent or other optical coating layer 33, in accordance with the present invention.

Referring to FIG. 10, a cross-section of the resonating waveguide 10 of FIGS. 1 and 4 is represented having an additional surface layer that can be a thin binding agent layer 33 of less than about 0.01 µm or any other index-profiling layer as the outermost layer. It is to be appreciated that this drawing is not to scale because the actual layer would be too thin to be seen in a true cross-section. A single-mode fiber-planar waveguide ring resonator as the orthogonal resonating coupler 400 of FIG. 4 can be constructed by using a glass fiber or cylinder as the inner cladding 102 with multiple dielectric layers 120, 130, and 33 near the surface. By controlling the indices of refraction of the guiding (or core) layer 120, the cladding (or overclad) layer 130 and the glass fiber inner cladding 102 (which serves as an underclad layer), it is possible to create waveguides that support a single propagation mode around the surface of the fiber over a specific wavelength range. The outer cladding layer 130 is thin (3-5 µm) to allow some of the mode (about at least 0.1% of the optical power) to propagate within the binding agent coating layer 33. Hence, the radial guiding provided by the dielectric ringed-core layer 120 allows the resonating waveguide 10 to support a single radial mode when larger diameters are employed.

Additional coatings (not shown) may also be applied to reduce scattering losses and optimize fiber-slab coupling. The outer cladding layer 130 on the fiber could also eliminate the need for the thin overclad layer 562 shown in FIG. 4 by replacing it or reducing its thickness.

The dielectric layers 120, 130, and 33 of the optical fiber can be formed using a variety of techniques. Traditional fiber draw processes allow precise control of the radial index distribution, so any near-surface layers could have accurately defined thickness and index profiles. Polymer coating thicknesses can be accurately controlled via dip-and-pull techniques or die coating, while polymer coating index of refraction can be set by composition control. Dopants applied at the surface of the fiber can also be thermally diffused into the fiber, producing graded-index profile layers with geometry and index controlled by dopant concentration and diffusion time and temperature for index-profiling of any desired performance. Hence, the shape of the guided mode can also be modified using waveguide profile techniques of additional dielectric layers within or outside of the ringed-core layer 120 to improve coupling to external waveguides. The precision control over the cylindrical resonator cross-section therefore enhances resonator use.

Having control over the whole cylindrical cross-section also allows incorporating a modulator unit directly on the fiber resonator. The use of electro-optical (EO) material or gain medium on the resonator surface could produce a resonator/modulator in a single device instead of needing to integrate multiple units. Hence, the material of the ringed-core 120 serves as a gain medium (e.g. pumped, doped waveguide materials) or a modulator material (e.g., EO polymer material). For example, the ringed-core layer 120 or even the inner cladding central layer 102 can be made of active materials such as Erbium or other Rare-Earth materials, nonlinear materials, or electro-optic materials, etc.

Accordingly, optical fibers or cylinders serving as the inner cladding 102 could be coated with a dielectric guiding layer that serves as the ringed-core 120 that provides optical gain when pumped at a different wavelength. Gain layer materials for the ringed-core 120 could include rare-earth doped coatings or dye-doped coatings. The gain layer material could be diffused into the surface of the fiber's inner cladding 102, or formed as part of a fiber redraw process. Gain layer coatings could be composed of organic materials or sol-gel layers to form multiple layers in the ringed-core 120.

Other coatings could be applied to the fiber or cylinder surface as the surface layer 33 to implement high speed switches. For example, electro-optic (E-O) coating layers could be applied. By changing the electric field applied to these layers using local substrate or integrated fiber electrodes, it would be possible to rapidly change the resonant wavelength of the filter.

Liquid crystal, optoceramic, lithium niobate or other optical-varying materials could be applied to the fiber or cylinder surface as the surface layer 33 or as the ringed-core 120 to implement guiding layers with tunable birefringence. Using this approach, it would be possible to fabricate polarization-independent resonators by adjusting the surface mode TE and TM propagation constants so that they are equal.

Also, fiber/cylinders can be designed to deliver light down the axis of the fiber while it is also being used as a resonator 10 with its tangential propagation. This would enable two photon or other nonlinear optic interactions.

The cross-section of the inner cladding 102 could also represent a glass sphere or microsphere 10 flame-cut, pulled or otherwise fabricated from a fiber to have the same ringed-core 120 surrounding the inner cladding 102. The microspheres therefore have multiple dielectric layers 120, 130, and 33 just like the cylindrical fiber resonator that support a single surface mode. These resonators 10 would provide sharper resonance response due to their single mode operation. The dielectric layers 120, 130, and 33 could be fabricated via surface coatings (e.g., polymers) or via diffusion of dopants that alter the index of refraction near the surface of the microsphere 10.

Figure 11:
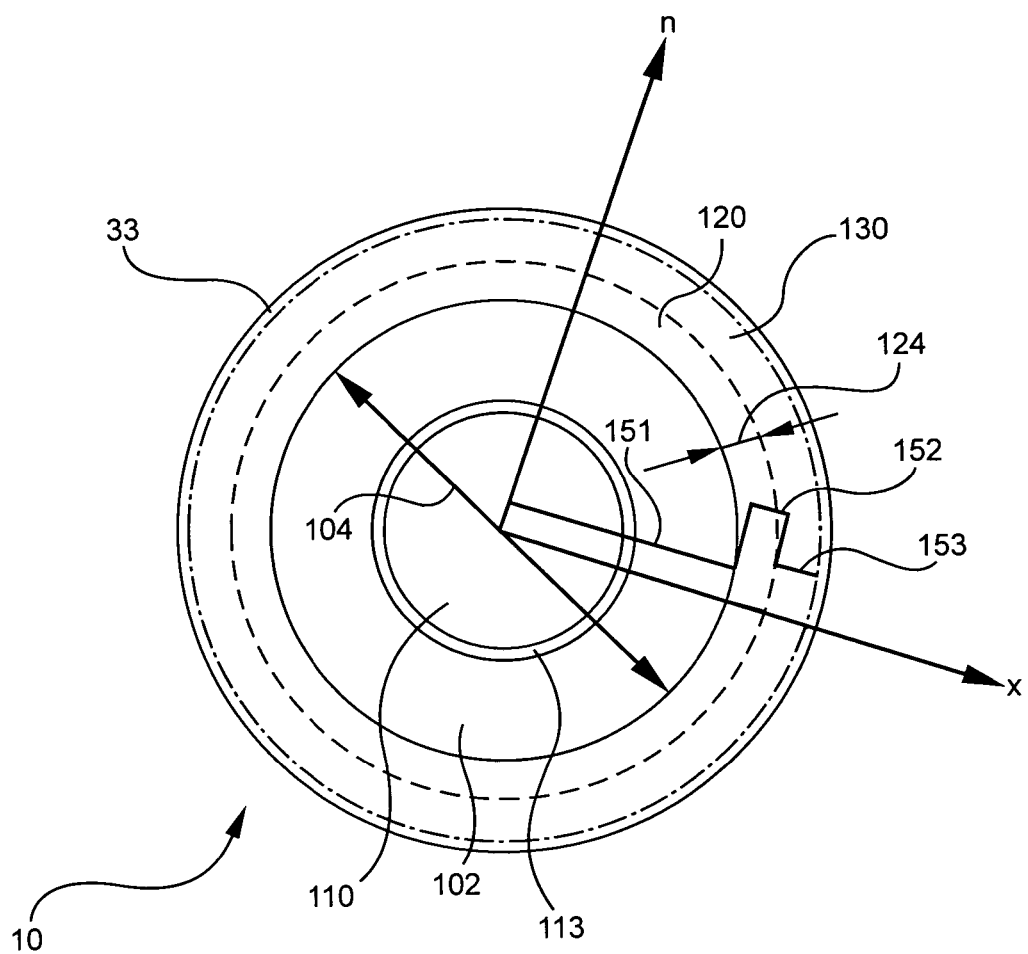
FIG. 11 is a cross-section view of the resonator 10 of FIG. 4 with the addition of an elongated aperture 110 coated with a binding agent or other optical coating layer 113, in accordance with the present invention.

Referring to FIG. 11, the solid inner cladding 102 is now shown having an elongated aperture 110 filled by the surrounding air as the resonating waveguide 10 for the orthogonal resonating coupler 400 of FIG. 4. This alternative configuration involves the use of a hollow fiber with a binding agent coating 113 on the inner surface. The un-filled air aperture 110 in the hollow fiber serves as a conduit for sample fluids. The hollowed-fiber resonator 10 could also have one or more outside surface coatings 33 to support single-mode operation, along with the ringed-core 120 and the outer cladding 130. In use, some of the light propagating around the outer surface due to the ringed-core 120 of the hollow fiber 10 would evanescently interact with the inner surface, covered by the binding layer 113. Index changes at the inner surface on the binding layer 113 would lead to slight changes in the propagation constant of the surface mode, shifting the resonant wavelength of the device for index-sensing of biological or chemical targets. Used without the inner surface binding agent 113, the resonating waveguide 10 could be used to measure changes in fluid index of refraction, optical absorption, or presence and absence of a pre-selected substance. In general, the more high index material of the ringed-core 120 disposed on the far-exterior surface, the more the mode will tend to want to propagate around the outer surface which is certainly needed for good mode coupling to an external transmission waveguide 460.

However, the higher-indexed material of the ringed-core located closer externally, than internally, reduces the amount of the field available for interrogating the fluid or binding agents located at or near the inner surface of the cylinder 10. Hence, in practice, the walls of the hollow fiber defined by the inner cladding 102 would need to be quite thin (i.e., a few micrometers thick) or even not present to allow surface mode evanescent field interaction with the inner surface of the binding layer 113. For maximum overlap between the inner surface binding agent layer 113 and the mode field of the ring core layer 120, the thin innerclad layer 102 should not be present at all.

The hollow fiber serving as the resonating waveguide 10 could be mechanically reinforced using thicker outer coatings 33 or an optionally much thicker outer cladding 130 that are selectively removed via UV exposure and wet chemical etching in regions where the hollow fiber surface comes in contact with the planar waveguide 460 of FIG. 5.

Having control over the whole cylindrical cross-section, and not just the outside dielectric coating, thus allow hollow fiber/cylinders to be fabricated to transport fluid or gas, as taught by the present invention. This fluid or gas can be used to maintain the temperature stability of the cylindrical resonator, control the temperature, deliver sensing medium, or other uses.

Planar waveguide substrates are also advantaged over the tapered waveguide coupling approaches shown in U.S. patent application 2002/0081055 and U.S. patent application 2002/0044739 in that the coupling between planar waveguides and the resonator structure can be accurately controlled through deposition of a thin dielectric clad layer 562 on the planar waveguide surface.

Referring back to FIG. 5, a core slab waveguide as the transmission waveguide 460 is shown on the substrate 500 covered by a thin overclad layer 562. An underclad layer (not shown) can also be fabricated between the slab waveguide 460 and the substrate 500. The substrate material can be silica, silicon, InP, GaAs or any other material commonly used for planar device substrates 500. The core 460, thin overclad 562 and underclad layers can be fabricated in a variety of inorganic materials such as doped silica, silicon, InP or GaAs, or in organic materials such as fluorinated polymers.

A thick overclad layer 563 can be deposited over the thin overclad layer 562. The thick overclad layer 563 is patterned via selective etching or photoresist liftoff to expose the thin overclad layer 562 in certain locations, especially in the interaction region 470.

Figure 12:
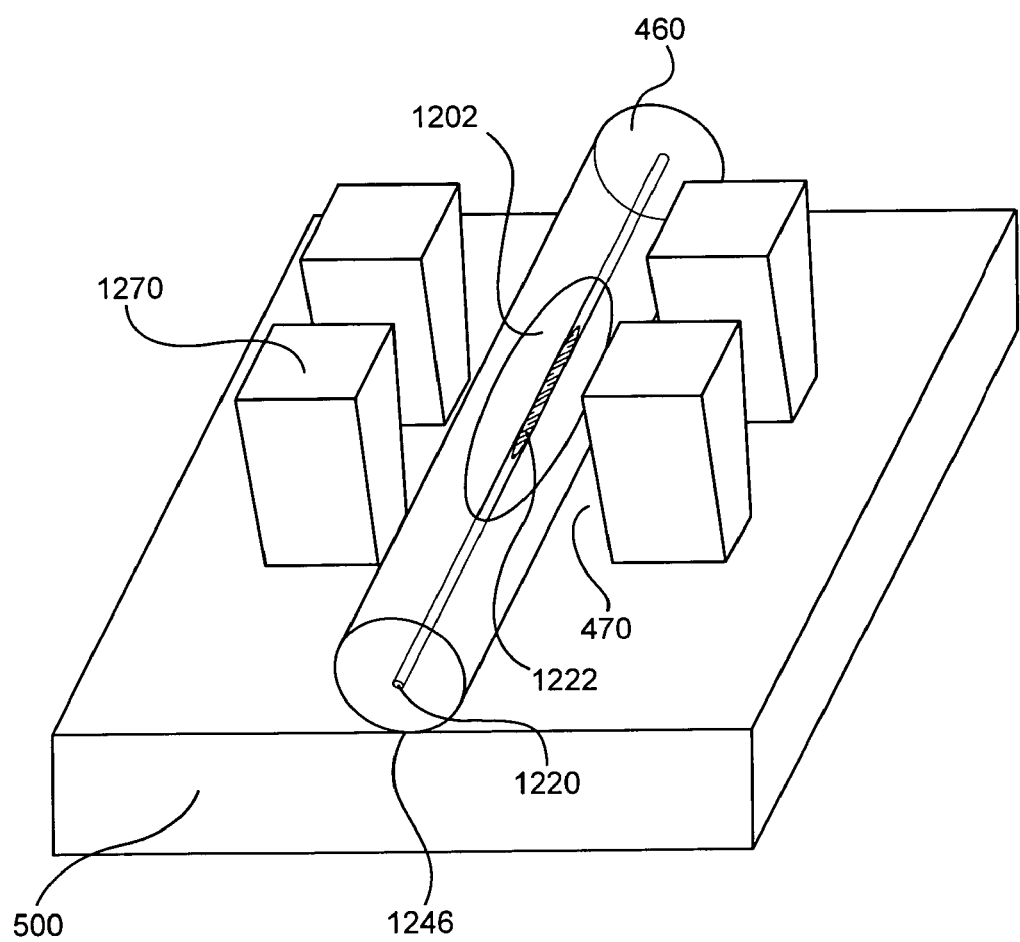
FIG. 12 is a perspective view of an exposed core fiber as the transmission waveguide 460 in FIG. 4, in accordance with the present invention.

In one example fabrication approach, polymer grippers 1270 of FIG. 12 can be fabricated on the thick overclad layer 563. The polymer grippers are oriented to hold the optical cylindrical fiber resonator 10 in position over the core slab waveguide 460. When such an optical cylindrical resonator 10 is held in contact with the thin overclad layer 562 over the slab waveguide 460, this geometry forms a 2-port fiber-slab ring resonator.

Other fabrication methods are possible that do not use polymer grippers. For example, the fiber could be held in place using a molded or machined external fixture. In another approach, the fiber could be accurately positioned using Si V-groove guiding structures. Adhesives or clamping structures could be used to fix the fiber in place after alignment or to fix the polymeric gripper themselves.

Referring to FIG. 12, the transmission waveguide 460 of FIG. 4 includes an optical fiber 1246, normally having an inner cladding 1202 surrounding an inner core 1220 but now having an exposed inner core section 1222 to provide a fiber-fiber resonator as the orthogonal resonating coupler 400 of FIG. 4. In order to show the exposed core 1222 in the interaction region 470, the resonating waveguide 10, in a spherical or cylindrical fiber form, that can be placed on top or on the bottom of the optical fiber 1246 serving as the transmission waveguide 460 of FIG. 4 is not shown. Even though not shown, the surface dielectric layers, such as the ringed-core 120 on the cylindrical fibers or microspheres are still used to provide the recursive path in the resonating optical fiber having a propagation direction circumferential to a longitudinal axis and having a guided circumferential mode with a second external evanescent field for orthogonally coupling to the first evanescent field of the optical fiber 1246 with the exposed core 1222. The resultant orthogonal resonating coupler would provide sharper resonance response due to the single-mode operation of the cylinder or spherical surface mode field of the resonating fiber or sphere 10.

As in FIG. 10, the resonator cylindrical fiber or microsphere 10 is coated with a binding agent 33 that changes its index of refraction when chemicals bond to the surface for use as a biosensor. Light out of the lower fiber's exposed core 1222 and into the cylindrical or spherical surface mode of the resonating waveguide 10, results in a predetermined resonant response. This fiber-fiber resonator approach has an advantage in that input and output to the sensing device are via optical fibers. Since low cost optical fiber connectors and interconnection methods already exist, this approach simplifies sensor interfacing and avoids problems associated with prior fiber-to-planar waveguide alignment.

Instead of etching or polishing the transmission fiber 1246 to expose the core 1220 on one side, the fiber may be narrowed, all around the exposed core region 1222, using a taper draw process to expand and expose the mode field in the mid-section of the fiber. Light again couples out of the expanded core mode and into the cylindrical or spherical surface mode. Since the two modes will be of different sizes and shapes, coupling efficiency will be low, which is acceptable and desirable for many fiber resonator applications. The large degree of mode field shape mismatch means that the fiber-fiber coupling will be less sensitive to changes in fiber separation distance. Another configuration for the fiber-fiber resonator, already mentioned, is where the tapered fiber serving as the transmission waveguide 460 is mounted on top of the resonating waveguide 10.

The orthogonal resonating coupler is thus shown as a fiber-fiber resonator configuration where the optical fiber 1246 has replaced the planar waveguide 460 of FIG. 5. The inner cladding 1202 of the fiber 1246 is selectively removed (using e.g., etching or polishing) to expose or nearly expose the fiber core 1220 in a central portion, similar to a conventional D-fiber at its end or a side-coupled fiber. The optical fiber 1246 is preferably positioned and fixed in place using various passive alignment structures, including polymer grippers (not shown).

Next the resonator cylindrical fiber or microsphere, used as the resonating waveguide 10 would be positioned over or under the optical fiber and fixed in place using polymer grippers 1270 suitably sized, aligned, and spaced to hold the resonating waveguide 10 in the interaction region 470. Other fiber or microsphere fixing methods could also be employed.

Such orthogonal resonating couplers can be aligned and assembled in one-dimensional (1D) or 2D arrays using passive alignment structures such as polymer grippers 1270, molded or machined surfaced or Si V-groove substrates 500 for positioning a top or bottom resonating waveguide 10 (not shown).

According to another aspect of the present invention, it is important to align or otherwise control the relative vertical position of the waveguide and resonator. Known polymeric fiber grippers can thus be used to provide this relative vertical positioning of the transmission waveguide 460 and resonator 10, without contacting optical surfaces and thereby introducing unwanted scattering losses. The fiber gripper mounting approach also simplifies the assembly of arrays of resonators on substrates.

Figure 15:
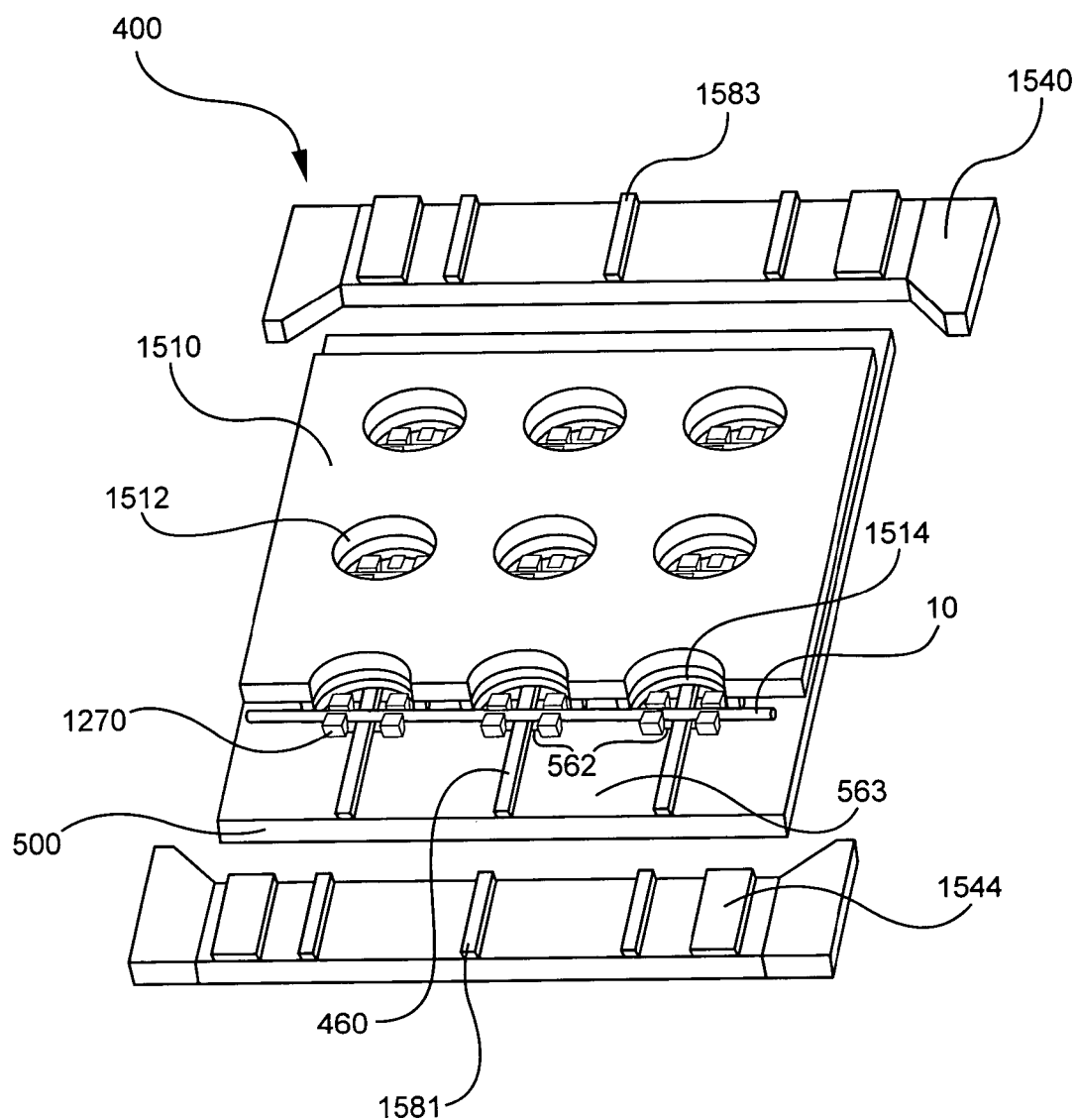
FIG. 15 is a perspective view of multiple resonators 10 of FIG. 5 evanescently coupled with multiple planar waveguides as the transmission waveguides 460, in accordance with the present invention.

Referring to FIG. 15, the orthogonal resonating coupler 400 of FIG. 5 can be reproduced in one-dimensional (1D) or 2D arrays to provide high density sensing and/or optical functionality. In such multiple devices, the consistency achievable with the fiber resonators due to its fiber-drawing precision has its greatest advantage. Multiple sensors, as separated by each well 1512 in a well plate 1510 can be integrated on a common 2-dimensional (2D) substrate 500 to increase measurement throughput and reduce assembly cost. A 2D implementation of the orthogonal resonating coupler 400 as fiber-planar resonator sensors is manufacturable. The process begins with a planar substrate material 500 that supports an array of planar waveguides 460. The substrate 500 and planar waveguides 460 can be fabricated in a variety of organic or inorganic materials. The substrate 500 and planar waveguides 460 are then covered with a thin overclad layer 562 overlaid with a thick overclad layer 563. The thin and thick overclad layers 562 and 563 reduce scattering losses in the planar waveguide 460 and enlarge the guided mode diameter for improved fiber coupling.

After overclad layer deposition of the thin and thick overclad layers 562 and 563, respectively, openings in the thick overclad 563 are patterned via selective etching or photoresist liftoff to expose the thin overclad layer 562 underneath. The openings are formed over the planar waveguides 460 to reduce the thickness of the overclad 563 in the region where resonating cylindrical optical fibers 10 will contact (actual physical touching contact or just closely spaced) the slab waveguides in the coupling interaction regions. Depending on the thickness and index of refraction of the optical fiber cladding layers 563 and 562, the substrate overclad removal of one or both layers can be partial, complete or not performed at all.

Polymer grippers 1270 are fabricated via a photolithographic process in the vicinity of the thick overclad openings exposing the thin overclad 562 underneath. Other fiber alignment and attachment methods can also be employed; including molded, machined or etched fiber guide structures attached using adhesives.

Using the polymer grippers 1270 or other alignment structures, optical resonating fibers 10 having the higher-index ringed core with binding agent coatings are positioned over the overclad openings or exposed thin overclad 562. Resonating fiber 10 insertion and attachment processes can be applied over the entire substrate 500 in a single operation. Optical cylindrical resonating fibers 10 can be shared by multiple planar waveguides 460, simplifying the assembly process and improving the uniformity of fiber-slab resonator characteristics across waveguides 460.

This fabrication approach allows resonating fibers 10 with the same binding agent to be used for all fiber-slab sensing sites, or for different resonating fibers 10 to be used in different locations. Thus, this approach provides flexibility in configuring the 2D sensor for different sensing applications (e.g., one fluid sample with many different binding site types, or many fluid samples with one or a few different binding site types).

After resonating fiber 10 placement over the planar waveguides 460, the well plate structure 1510 is lowered onto the 2D sensing substrate 500. An adhesive seal 1514 around the bottom of each well plate hole or well 1512 prevents fluid leakage while sealing the region around each optical resonating fiber 10. The breakaway view of the well plate 1510 lowered on the sensing substrate 500, allows a view of the fiber-slab resonator as the orthogonal resonating coupler 400 of FIG. 4 at the bottom of each well plate.

The completed 2D sensor array can be mounted into a suitable measurement system. Coarse and fine alignment structures 1540 and 1544, respectively, guide the 2D sensor array into alignment with source 1581 and detector 1583 waveguide arrays. Not shown are tunable laser sources or tunable detector filters required for a full implementation of the sensing system.

The 2D sensor array has the advantage of optical interrogation via a 1-dimensional waveguide array. Therefore individual sensing locations can be wavelength division multiplexed, reducing the number of sources and detectors required. Furthermore, the narrow passband tunable detector filters in the system could be implemented using fiber-slab resonator technology.

It will be apparent to those skilled in the art that various modifications and variations can be made to the present invention, such as adding more than one resonating waveguides 10 or transmission waveguides 460 and in different combinations component variations, for different applications, such as providing higher Q resonances with multiple resonators 10, multiplexing or passband tuning, etc., without departing from the spirit and scope of the invention. Thus it is intended that the present invention cover the modifications and variations of this invention provided they come within the scope of the appended claims and their equivalents.

What is claimed is:

1. A transverse closed-loop waveguide resonator comprising:
    an inner cladding having a surface peripherally forming a substantially cylindrical closed-loop shape for confining light to the surface, the inner cladding having a first diameter thickness and a first index of refraction profile in a cross-sectional portion of the transverse closed-loop resonator; and
    a ringed-core corresponding to the closed-loop shape disposed on the corresponding surface of the inner cladding, the ringed-core being so dimensioned and having a second thickness of material thinner than the first diameter thickness, and a second index of refraction profile greater than the first index of the inner cladding by an index delta in the cross-sectional portion of the transverse closed-loop resonator, such that the ringed-core confines guided light radially within the ringed-core around the closed-loop shape, the inner cladding having a first average index of refraction for limiting whispering-gallery-modes to have a mode index of refraction lower than the average index of refraction of the inner cladding, the ringed-core surrounding the inner cladding sufficiently thin and having a second average index of refraction greater than the first average index of the inner cladding for supporting an index-guided resonant optical circumferential mode having a mode index of refraction greater then the average index of the first average index of refraction of the inner cladding.

2. The transverse closed-loop resonator of claim 1, wherein the substantially cylindrical closed-loop shape tapers at least on one arcuate side of the surface.

3. The transverse closed-loop resonator of claim 1, wherein the closed-loop shape is substantially cylindrical for providing a substantially circumferential light propagation around the substantially cylindrical shape for the ringed-core to support an index-guided resonant optical mode at a resonant wavelength having at least 0.1% of the optical power existing outside of the ringed-core.

4. The transverse closed-loop resonator of claim 3, further comprising a transmission waveguide for evanescently coupling with the index-guided resonant optical mode of the ringed-core.

5. The transverse closed-loop resonator of claim 1, further comprising an outer cladding corresponding to the closed-loop shape surrounding the corresponding surface of the ringed-core, the outer cladding having a third index of refraction profile less than the second index of refraction profile of the ringed-core.

6. The transverse closed-loop fiber of claim 5, wherein the outer cladding comprises air having the dielectric index of air.

7. The transverse closed-loop resonator of claim 5, wherein the outer cladding comprises a guided dielectric layer.

8. The transverse closed-loop resonator of claim 7, wherein the guided dielectric layer has a graded index.

9. The transverse closed-loop resonator of claim 7, wherein the guided dielectric layer comprises at least two different dielectric layers having a composite stepped-index.

10. The transverse closed-loop resonator of claim 5, wherein the ringed-core comprises a dielectric core layer concentrically configured between the inner and outer claddings to provide a predetermined total internal reflection (TIR) index profile for supporting the index-guided resonant optical mode having a mode index of refraction greater then the average index of the first index of refraction profile of the inner cladding.

11. The transverse closed-loop resonator of claim 10, wherein the dielectric core layer has a graded index.

12. The transverse closed-loop resonator of claim 10, wherein the dielectric core layer comprises at least two different dielectric layers having a composite stepped-index.

13. The transverse closed-loop resonator of claim 1, wherein the inner cladding has an elongated aperture filled by the surrounding air.

14. A method of orthogonally resonating evanescent fields, comprising:
providing an optical transmission in a propagation direction parallel to an optical axis and having a single guided longitudinal mode with a first external evanescent field;
providing a recursive path in an optical fiber having a propagation direction circumferential to a longitudinal axis, the recursive path not coupling whispering gallery modes and having a single guided circumferential mode with a second external evanescent field; and
orthogonally coupling the first and second evanescent fields.

15. An orthogonal resonating coupler, comprising:
a transmission waveguide having a propagation direction parallel to an optical axis and having a guided longitudinal mode with a first external evanescent field;
a resonating fiber having a propagation direction circumferential to a longitudinal axis and having a guided circumferential mode with a second external evanescent field;
an interaction region closely spaced between the transmission waveguide and the resonating fiber for orthogonally coupling the first and second evanescent fields; and
a pair of lateral confinement sections comprising fiber Bragg gratings written on opposed ends of the resonating fiber outside of the interaction region.

16. A transverse closed-loop waveguide resonator comprising:
an inner cladding comprising a glass sphere having a surface peripherally forming a closed-loop shape for confining light to the surface, the inner cladding having a first diameter thickness and a first index of refraction profile in a cross-sectional portion of the transverse closed-loop resonator; and
a ringed-core corresponding to the closed-loop shape disposed on the corresponding surface of the inner cladding, the ringed-core having a second thickness of material thinner than the first diameter thickness, and a second index of refraction profile greater than the first index of the inner cladding by an index delta in the cross-sectional portion of the transverse closed-loop resonator such that the ringed-core can guide light within the ringed-core around the closed-loop shape.

17. The transverse closed-loop resonator of claim 16, wherein the glass inner cladding has a graded index.

18. The transverse closed-loop resonator of claim 16, wherein the glass inner cladding comprises at least two different dielectric layers having a composite stepped-index.

19. An orthogonal resonating coupler, comprising:
a transmission waveguide having a propagation direction parallel to an optical axis and having a guided longitudinal mode with a first external evanescent field;
a resonating fiber having a propagation direction circumferential to a longitudinal axis and having a guided circumferential mode with a second external evanescent field; and
an interaction region closely spaced between the transmission waveguide and the resonating fiber for orthogonally coupling the first and second evanescent fields,
wherein the resonating fiber comprises an inner cladding having a first average index of refraction for limiting whispering-gallery-modes to have a mode index of refraction lower than the average index of refraction of the inner cladding, and a ringed-core surrounding the inner cladding sufficiently thin and having a second average index of refraction greater than the first average index of the inner cladding for supporting an index-guided resonant optical circumferential mode having a mode index of refraction greater then the average index of the first average index of refraction of the inner cladding.

20. The orthogonal resonating coupler of claim 19, wherein the transmission waveguide comprises an optical fiber having an exposed inner core.

21. The orthogonal resonating coupler of claim 19, wherein the resonating fiber comprises:
an inner cladding having a first average index of refraction for limiting whispering-gallery-modes to have a mode index of refraction lower than the average index of refraction of the inner cladding; and a ringed-core surrounding the inner cladding sufficiently thin and having a second average index of refraction greater than the first average index of the inner cladding for supporting an index-guided resonant optical circumferential mode having a mode index of refraction greater then the average index of the first average index of refraction of the inner cladding.

22. The orthogonal resonating coupler of claim 19, wherein the interaction region comprises space aligned by polymeric grippers.

23. The orthogonal resonating coupler of claim 19, wherein the resonating fiber further comprises a binding agent layer on at least one surface of the resonating fiber.

24. The orthogonal resonating coupler of claim 19, wherein the resonating fiber comprises:

an inner cladding having a surface peripherally forming a closed-loop shape for confining light to the surface, the inner cladding having a first diameter thickness and a first index of refraction profile in a cross-sectional portion of the resonating fiber; and a ringed-core corresponding to the closed-loop shape disposed on the corresponding surface of the inner cladding, the ringed-core having a second thickness of material thinner than the first diameter thickness, and a second index of refraction profile greater than the first index of the inner cladding by an index delta in the cross-sectional portion of the resonating fiber such that the ringed-core can guide light within the ringed-core traversely around the closed-loop shape.

25. The orthogonal resonating coupler of claim 24, wherein the first diameter thickness of the inner cladding is within a range about 12.5 µm to 500.35 µm.

26. The orthogonal resonating coupler of claim 24, wherein the first diameter thickness of the inner cladding is within a range about 10 µm to 2000 µm.

27. The orthogonal resonating coupler of claim 24, wherein the ringed-core is actively doped with at least one rare-earth ion.

28. The orthogonal resonating coupler of claim 24, wherein the ringed-core has a second thickness of about 1.5-3 µm.

* * * * *